US010402545B2

(12) United States Patent
Gorfein et al.

(10) Patent No.: US 10,402,545 B2
(45) Date of Patent: *Sep. 3, 2019

(54) SYSTEMS AND METHODS FOR MANAGING DATA ASSETS ASSOCIATED WITH PEER-TO-PEER NETWORKS

(71) Applicant: IP SQUARED TECHNOLOGIES HOLDING, LLC, New York, NY (US)

(72) Inventors: William Gorfein, New York, NY (US); Josh Partridge, New York, NY (US)

(73) Assignee: IP SQUARED TECHNOLOGIES HOLDING, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/219,828

(22) Filed: Mar. 19, 2014

(65) Prior Publication Data

US 2014/0289862 A1 Sep. 25, 2014

Related U.S. Application Data

(63) Continuation-in-part of application No. 13/847,418, filed on Mar. 19, 2013.

(60) Provisional application No. 61/879,807, filed on Sep. 19, 2013.

(51) Int. Cl.
*G06F 21/10* (2013.01)
*G06F 21/16* (2013.01)

(52) U.S. Cl.
CPC .............. *G06F 21/10* (2013.01); *G06F 21/16* (2013.01)

(58) Field of Classification Search
CPC ....... G06F 21/10; G06F 21/16; H04L 63/061; H04L 63/205

USPC ........................................................ 726/26
See application file for complete search history.

(56) References Cited

U.S. PATENT DOCUMENTS

| 9,129,420 B2* | 9/2015 | Baldwin ................. G06F 21/00 |
| 2002/0146122 A1* | 10/2002 | Vestergaard et al. ......... 380/231 |
| 2006/0029093 A1* | 2/2006 | Van Rossum .......... G06Q 30/02 370/432 |
| 2008/0059536 A1* | 3/2008 | Brock et al. ................... 707/200 |
| 2008/0289006 A1 | 11/2008 | Hock et al. |
| 2009/0083414 A1* | 3/2009 | Lazovsky et al. ............ 709/224 |

(Continued)

FOREIGN PATENT DOCUMENTS

| EP | 2200248 A1 | 12/2008 |
| WO | 2012/009740 A1 | 1/2012 |

*Primary Examiner* — Chau Le
(74) *Attorney, Agent, or Firm* — Cotman IP Law Group, PLC

(57) ABSTRACT

A system and method for targeting content to BitTorrent users is presented. The system searches torrent file websites for a torrent file according to specified search criteria and verifies that the torrent file corresponds to a media file containing the copyrighted work. The system obtains tracker server information from the torrent file and obtains the IP addresses of participants currently connected to the torrent file from the tracker server, attempts to establish a connection with a participant based on an IP address selected from the IP addresses and, if successful, receives a data piece with a cryptographic hash from the participant. The cryptographic hash is verified to correctly match with the torrent file. The system provides for correlation of information about participants in the peer-to-peer network and using the information to provide targeted campaign to each user based on the user's preferences.

17 Claims, 13 Drawing Sheets

(56) References Cited

U.S. PATENT DOCUMENTS

| | | | |
|---|---|---|---|
| 2009/0100128 A1* | 4/2009 | Czechowski et al. | 709/203 |
| 2009/0276522 A1* | 11/2009 | Seidel | 709/224 |
| 2010/0169441 A1* | 7/2010 | Lafleur et al. | 709/206 |
| 2010/0185769 A1 | 7/2010 | Zhang et al. | |
| 2011/0029609 A1* | 2/2011 | Kavallierou et al. | 709/204 |
| 2011/0119293 A1* | 5/2011 | Taylor et al. | 707/769 |
| 2011/0276449 A1* | 11/2011 | Funderburk | G06Q 30/04 705/34 |
| 2012/0054278 A1* | 3/2012 | Taleb et al. | 709/204 |
| 2012/0136966 A1 | 5/2012 | Chavez et al. | |
| 2013/0042016 A1 | 2/2013 | Perkuhn et al. | |
| 2013/0117190 A1* | 5/2013 | Wald | 705/310 |
| 2014/0278796 A1* | 9/2014 | Arini et al. | 705/7.33 |
| 2014/0289862 A1* | 9/2014 | Gorfein | G06F 21/10 726/26 |
| 2017/0208034 A1* | 7/2017 | Rostami-Hesarsorkh | H04L 29/06557 |
| 2017/0310558 A1* | 10/2017 | Veres | H04L 41/22 |

\* cited by examiner

FIGURE 4B

PAGE 1

The following recorded addresses were downloading the same file.
Hash tag: "59C7FF97B3E2CA0A952C8A63B60AF0988C3E7B1E"

File Name: "torrentdownloads.net Scary Or Die 2012 DVDRip XviD-IGUANA.torrent [mnova.eu] Scary_Or_Die_2012_DVDRip_XviD_IGUANA.torrent Scary.Or.Die.2012.DVDRip XviD-IGUANA.torrent 59C7FF97B3E2CA0A952C8A63B60AF0988C3E7B1E.torrent Scary.Or.Die.2012.DVDRip "

| Host IP address | Capture Time UTC (Most Recent) | ISP |
|---|---|---|
| 67.76.0.152 | 10/3/2012 14:37:16 | EMBARQ CORPORATION |
| 67.233.132.248 | 12/6/2012 23:40:20 | EMBARQ CORPORATION |
| 67.233.194.114 | 12/9/2012 0:36:42 | EMBARQ CORPORATION |
| 67.239.134.141 | 10/3/2012 14:37:16 | EMBARQ CORPORATION |
| 67.235.163.115 | 12/11/2012 13:56:17 | EMBARQ CORPORATION |
| 67.235.167.183 | 12/4/2012 22:04:26 | EMBARQ CORPORATION |
| 67.235.175.4 | 11/16/2012 23:36:26 | EMBARQ CORPORATION |
| 67.235.200.209 | 12/2/2012 1:27:21 | EMBARQ CORPORATION |
| 67.235.206.174 | 11/13/2012 3:03:40 | EMBARQ CORPORATION |
| 67.239.254.29 | 11/16/2012 22:38:58 | EMBARQ CORPORATION |
| 67.237.122.73 | 10/3/2012 14:37:16 | EMBARQ CORPORATION |
| 67.237.173.78 | 12/11/2012 2:35:53 | EMBARQ CORPORATION |
| 67.239.227.183 | 10/28/2012 3:32:52 | EMBARQ CORPORATION |
| 69.34.0.114 | 11/27/2012 19:38:15 | EMBARQ CORPORATION |
| 69.68.79.93 | 11/16/2012 5:21:04 | EMBARQ CORPORATION |
| 71.3.155.148 | 10/3/2012 14:37:16 | EMBARQ CORPORATION |
| 71.48.246.81 | 10/3/2012 14:37:16 | EMBARQ CORPORATION |
| 71.196.35.242 | 11/30/2012 7:11:51 | Comcast Cable Communications LLC |
| 71.199.250.55 | 10/29/2012 16:36:49 | Comcast Cable Communications LLC |
| 71.203.168.37 | 11/12/2012 23:30:27 | Comcast Cable Communications LLC |
| 71.203.53.254 | 10/29/2012 5:59:44 | Comcast Cable Communications LLC |
| 71.203.53.93 | 10/3/2012 14:37:16 | Comcast Cable Communications LLC |

PAGE 2 (Next Excel Tab)

The following recorded addresses were downloading the same file.
Hash tag: 3GD687DF8G67DFG76SDDFBG6S08DFG8SD6

File Name: "torrentdownloads.net Scary Or Die 2012 DVDRip XviD-IGUANA.torrent [mnova.eu] Scary_Or_Die_2012_DVDRip_XviD_IGUANA.torrent Scary.Or.Die.2012.DVDRip XviD-IGUANA.torrent

| Host IP address | Capture Time UTC (Most Recent) | ISP |
|---|---|---|
| 71.52.3.153 | 11/24/2012 12:39:26 | EMBARQ CORPORATION |
| 71.52.12.201 | 10/18/2012 17:00:17 | EMBARQ CORPORATION |
| 71.52.108.136 | 10/18/2012 13:22:08 | EMBARQ CORPORATION |
| 71.53.245.179 | 10/3/2012 14:37:16 | EMBARQ CORPORATION |
| 76.0.177.107 | 11/9/2012 6:06:30 | EMBARQ CORPORATION |
| 76.0.177.117 | 12/3/2012 5:15:78 | EMBARQ CORPORATION |
| 76.3.17.225 | 10/3/2012 14:37:16 | EMBARQ CORPORATION |
| 76.5.48.198 | 10/3/2012 14:37:16 | EMBARQ CORPORATION |
| 174.48.115.21 | 10/16/2012 12:39:56 | Comcast Cable Communications LLC |
| 174.98.11.215 | 10/16/2012 8:43:08 | Comcast Cable Communications LLC |
| 24.127.220.93 | 10/28/2012 8:05:07 | Comcast Cable Communications LLC |
| 24.129.22.2 | 10/16/2012 17:13:55 | Comcast Cable Communications LLC |
| 50.138.122.155 | 11/8/2012 0:18:49 | Comcast Cable Communications LLC |

FIGURE 5C

Update   Select All   Select None

From Date: [          ]   To Date: [          ]

(13)  ☐ 9FAAB424ADC7A3ACF8272DDDC3C1BC4C165D2674
(43)  ☐ 98B3AAF87DE338938B22F86B93ED58088A1600D9
(1)   ☐ 0DB65DFCC613842FA3A3C84571549F382D1BAF06
(152) ☐ E78398D2AF210469FED2848CA2D567B652B8F72A
(49)  ☐ 6C18728C64E6102028D71D573FD8FE019A843450
(32)  ☐ 1AB98D124719A1715F2ECBA44E9DE533959353D1
(201) ☐ 337C326734C0E24034823C10A38F92421904AC41

(12)  ☐ COX COMMUNICATIONS
(5)   ☐ QWEST COMMUNICATIONS COMPANY LLC
(260) ☐ ROAD RUNNER HOLDCO LLC
(23)  ☐ CABLE ONE INC.
(10)  ☐ CRICKET COMMUNICATIONS INC
(5)   ☐ VERIZON WIRELESS

(56)  ☐ Washington Eastern
(12)  ☐ Washington Western
(75)  ☐ California Northern
(76)  ☐ Texas Eastern
(1)   ☐ Texas Northern
(0)   ☐ Texas Southern
(32)  ☐ Texas Western

FIGURE 5D

SYSTEMS AND METHODS FOR MANAGING DATA ASSETS ASSOCIATED WITH PEER-TO-PEER NETWORKS

CROSS-REFERENCE TO RELATED APPLICATIONS

This application is a continuation-in-part of U.S. patent application Ser. No. 13/847,418, filed on Mar. 19, 2013, and claims priority from U.S. Provisional Patent Application Ser. No. 61/879,807, filed on Sep. 19, 2013, entitled "Systems And Methods For Surveying, Managing, And Analyzing Data Assets Associated With Peer-To-Peer Networks," the specifications of which are incorporated herein by reference in their entirety.

BACKGROUND OF THE INVENTION

Field of the Invention

The present invention relates to application of information associated with and derived from peer-to-peer networks. More particularly, the present invention relates to data mining on peer-to-peer networks, including the surveying and collection of target content for downstream application in various business environments and legal enforcement efforts.

Description of the Related Art

The broad accessibility of broadband internet service has allowed users to quickly and often illegally download media files such as music, movies, and games.

Data assets can be shared on and across networks using a variety of devices and protocols. Moreover, the activity and identity of users can constitute valuable information when properly surveyed and cataloged. The sharing and distribution of information via electronic communication networks has traditionally followed the client-server model. A central server sends the entire file to each client that requests it. The clients only communicate with the server, and never to each other. The main advantage of this method is that it is simple to set up. However, this method can be problematic with files that are large or very popular. It requires a great deal of bandwidth and server resources to distribute such a file, since the server must transmit the entire file to each client. Mirrors partially address this shortcoming by distributing the load across multiple servers, but at a significant expense.

Another popular method of transferring media uses a peer-to-peer network. BitTorrent is the most popular protocol for transferring large files over peer-to-peer networks and have accounted for a large percentage of total internet traffic. BitTorrent works by separating a file to be transferred into many small pieces to be distributed amongst multiple computers. A computer may receive one piece of the file from one particular computer, while simultaneously getting another piece of the file from a different computer. Any computer has the ability to upload already downloaded pieces of the file to any other computer that lacks that piece of the file.

The peer-to-peer model has superseded the client-server model in many areas of use, particularly in that of file sharing, in regard to both legitimate and illegal uses (e.g., in violation of copyrights that pertain to the data content in the files that are shared on the network). In contrast to the client-server model, the P2P model conflates clients and servers such that each is a node (also called a peer) that can be both a client and a server at the same time; nodes are generally assigned the same properties and privileges such that any node can access information stored in other nodes and provide information to other nodes. Thus, a network comprising nodes/peers is called a peer-to-peer (P2P) network. P2P networks often comprise overlay networks on top of an existing IP network such as the Internet. A well-known example of a P2P network is the set of nodes (such as personal computers) connected to each other using the P2P protocol BitTorrent; note therefore that a node may be regarded as both a data structure and a computer device, simultaneously or alternatively, as is understood by persons of ordinary skill in the art.

Peer-to-peer protocols are used to distribute a wide range of content to millions of people. The content typically comprises large data files or a collection of related files, such as multimedia containing movies and music, but more abstractly content can be any type of data elements (e.g., any object residing in computer memory). Because data often has commercial value, said content may be termed "data assets." The fundamental design of P2P protocols can be broadly described as comprising two distinguishable methods for the coordinating of file sharing: a Centralized Method and a Decentralized Method. These broad types continue to evolve and spawn new variants of methods, and these two category names have been assigned here for the purposes of imposing a conceptual model only, and they are intended to be construed broadly to encompass the full range of P2P methods applied in the relevant technological arts.

Briefly, the Centralized Method uses one or more servers designated as a "tracker" to coordinate communication and data exchanges with peers.

In the BitTorrent scheme, sets of files ("torrents") are pointed to by a small file called a "torrent file," and the contents of a torrent may include multimedia data files, URL identifiers, executable files and data objects. For example, a network for sharing motion picture movie files would comprise torrent files comprising pointers to the movie file desired by the user making the request for the transaction, plus a tracking file and associated images and text that provide additional entertainment content related to the main multimedia file. The term "content" can refer to any and all of such contents of a torrent. Users of BitTorrent systems and services are often permitted to discover content on a particular P2P network via a web-based torrent search engine which may be privately maintained by the network owner (e.g., a portal or website) or publicly presented through third parties, such as commercial search engines (e.g., Google). In the latter case, torrent files may be specifically identified by using search parameters that limit the search results to torrent files, which carry the ".torrent" extension.

When a user obtains a torrent file, they are acquiring a small file that contains information on the larger files desired for downloading to their local machine. The torrent file tells the torrent client (a local application on the user's machine) what are the names of the files being shared, the URL for the tracker, and more. Popular torrent clients known in the art include, for example, uTorrent, Vuze, Transmission, and Deluge. The local torrent client then calculates a hash code, which is a unique code specific to that unique torrent, analogous to an ISBN or catalog number, or a fingerprint, which hash code is then used to identify the desired content distributed among the other nodes on the network, to be downloaded by the client. P2P file sharing is generally faster, and therefore more suitable for sharing large files, than that of the Client-server model, because it acquires the target content of a torrent in subdivided packets which are downloaded simultaneously from many nodes on the network in parallel, rather than downloading an entire file from just one memory location.

One example of an emerging adaptation in P2P systems is the magnet link. A magnet link is essentially a hyperlink containing the hash code for a torrent, which is passed to the local torrent client immediately enabling the identification of peers and the download of torrents from nodes. Magnet links can avoid the requirement of using a tracker because of their use of distributed hash tables (DHT). Many P2P service providers, on their web-based portals or browser-based search engines, now offer magnet links in conjunction with each instance of a downloadable torrent file. The present invention is adapted to accommodate network activity using magnets and other such variants, which are essentially modifications of the same P2P networks. Other adaptations known in the art include "Peer Exchange" (PEX) and "trackerless" torrents. From the perspective of individual users, these adaptations are often effectively invisible since the local client often handles the execution of the appropriate instructions necessary for accommodating each variant on a network. Functionally, these network protocols can resemble hybridized forms of the Centralized and Decentralized Models.

For example, DHT is used to find the IP addresses of peers, typically in addition to a tracker. It is enabled by default in clients such as uTorrent and Vuze and millions of people are already using it without knowing. DHT's function is to find peers who are downloading the same files, but without communicating with a central BitTorrent tracker (e.g., a server, a network owner or service provider). Similarly, PEX is another means of finding IP addresses; rather than mimicking a tracker, its local client identifies peers directly connected to the local node, and it queries these peers for the addresses of their peers, and so on.

In an attempt to increase anonymity, fault tolerance, and scalability, a decentralized method to augment, and often times replace the aforementioned centralized model has been adopted. The decentralized method is based on Distributed Hash Tables (DHT), and provides a lookup service similar to, or in the format of: (Key, Value) pairs which are stored in the DHT, and any participating node can retrieve the value associated with a given key.

In order to access these dynamic and ever-evolving networks, and to accurately survey the information in and passing through them, particular systems and methods are required and they must be not only tailored for distinct tasks but flexible enough to accommodate slight differences between individual P2P networks. Additionally, greater power is needed in order to extract, analyze, compile, and utilize the full scope of data assets to be found in P2P networks.

There is a current need for an efficient means of tracking and cataloging the information present within, and being passed among, the nodes in peer-to-peer networks.

BRIEF SUMMARY OF THE INVENTION

One or more embodiments of an invention described herein provide for surveying, managing, and analyzing data assets associated with peer-to-peer networks and using the data to provide targeted action. One embodiment creates a search criteria based on a copyrighted work. The system maintains a website database of at least one torrent file website and searches each of the torrent file websites for a torrent file according to the search criteria. The system stores the torrent file to a torrent file database and verifies that the torrent file corresponds to a media file containing the copyrighted work. The system obtains tracker server information from the torrent file. A plurality of participant IP addresses of participants currently connected to the torrent file is obtained from the tracker server. The plurality of participant IP addresses is stored into an IP address database. The system attempts to establish a connection with a participant associated with an IP address selected from the plurality of participant IP addresses in the database and receives a data piece with a cryptographic hash from the participant. The cryptographic hash is verified to correctly match with the torrent file. The system receives a download completion status from the participant and records a corresponding capture time and verifies that the participant is sharing the media file. The participant is disconnected. The system obtains geographic data of the participant based on the participant IP address and associates the participant to a legal jurisdiction based on the geographic data. With the IP and geographic information about the user, proper legal remedy may be sort in the proper jurisdiction. The legal remedy may be in the form of DMCA (Digital Millennium Copyright Act) takedown letters, and/or other legal action.

One or more embodiments of the present invention provide novel means for establishing a "digital fingerprint" of a user or a computer having a presence on one or more networks. Such unique identifying information, which is gleaned from unique aspects of a network user's behavior, computing device, keywords, or other mine-able data provides information that can be used as evidence in criminal or other enforcement actions against malefactors on the Internet or who use a network to engage in illicit activity, and it can even create a record of who used what computer from what location at what time to engage in such activities, among other material information useful to enforcement authorities and personnel. For example, in one such embodiment, every peer within a DHT corresponds to a unique Node ID. The Node ID is encrypted by a set standard in accordance to the particular partitioning scheme. Evidence of the Node ID may be located on the Peer's physical computer. This Node ID is saved onto the Peer's local computer in a file, generally in a folder determined by the Client software being used. The Node ID may be decrypted to discover the IP Address, local port number, and start time corresponding to the Peer. Evidence of the file which keeps reference of the Node ID may be sought out on the Peer's local computer. This has application in legal court processes where the existence of the file may serve as a digital fingerprint that may help identify the local machine, and help obtain conviction in a trial of a Peer accused of committing an illegal act.

One or more embodiments of the present invention provide novel systems and methods for application in industries including but not limited to advertising and marketing, sales, insurance (ranging from underwriting to claims processing to lead generation for policy sales), intellectual property protection, the anti-piracy and digital security arts, polling and social science research, and the like. For instance, embodiments of the present invention may be configured to provide business applications for in-house use by financial services companies to build and maintain databases in which our software can track, monitor, mine and perform other operations on transaction and/or customer data for management, security, and other business purposes. Relevant business applications, for example, include means for using the present invention to track money to detect fraud, money laundering, and other suspicious movements of cash, where suspicion may be related to the quantities of cash being moved, the IP addresses involved in all levels of the transaction, and other elements of the digital exchange of data therein via one or more networks. Monitoring applications can track movements of money to and from particular countries or above certain size thresholds, and these parameters can be applied at different values for different peers, or at consistent values for a population of peers.

One or more embodiments of the present invention provide tools for performing audience discovery and analysis, as well as remarketing techniques, for the marketing industry; implementing anti-piracy tactics such as enforcing legal compliance, waging pro-active campaigns and countermeasures against infringers (e.g., a virus attack that floods a network with fake nodes); surveying information about the theft of intellectual property; performing general research such as: popularity analysis, audience analysis, demographic analysis on a network or of the content on a network; and providing insurance industry services such as assisting underwriting in assessing probabilities related to infringement of intellectual property based on past occurrences on P2P networks (e.g., especially for entertainment media producers).

These and other aspects of the present invention will become more fully understood upon further review of the following specifications and accompanying drawings.

BRIEF DESCRIPTION OF THE DRAWINGS

The above and other aspects, features and advantages of the invention will be more apparent from the following more particular description thereof, presented in conjunction with the following drawings wherein:

FIGS. 4A-C illustrate exemplary screenshots of the user interface in accordance with one or more embodiments of the present invention.

FIGS. 5A-D illustrate exemplary screenshots of the user interface to the infringer data in accordance with one or more embodiments of the present invention.

DETAILED DESCRIPTION

A system and method for surveying, managing, and analyzing data assets associated with peer-to-peer networks and using the data to provide targeted action will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the true scope of the invention.

Torrent files are registered with at least one tracker server. The tracker server maintains lists of the peers currently participating in the torrent file. Participants (peers) that want to download the file must first obtain a torrent file for it and connect to the specified tracker server, which tells them from which other peers to download the pieces of the file. The task of distributing the file is shared by those who want it. The file being distributed is divided into evenly sized segments called pieces. As each peer attempting to download the media file receives a new piece of the file it becomes a source of that piece for other peers.

Each peer uses BitTorrent client software to make use of the torrent file. Pieces are typically downloaded non-sequentially and are rearranged into the correct order when all the pieces are complete by the BitTorrent client. The BitTorrent client monitors which pieces it needs, and which pieces it has and can upload to other peers. Due to the nature of this approach, the download of any file can be halted at any time and be resumed at a later date, without the loss of previously downloaded pieces.

Figure 1:
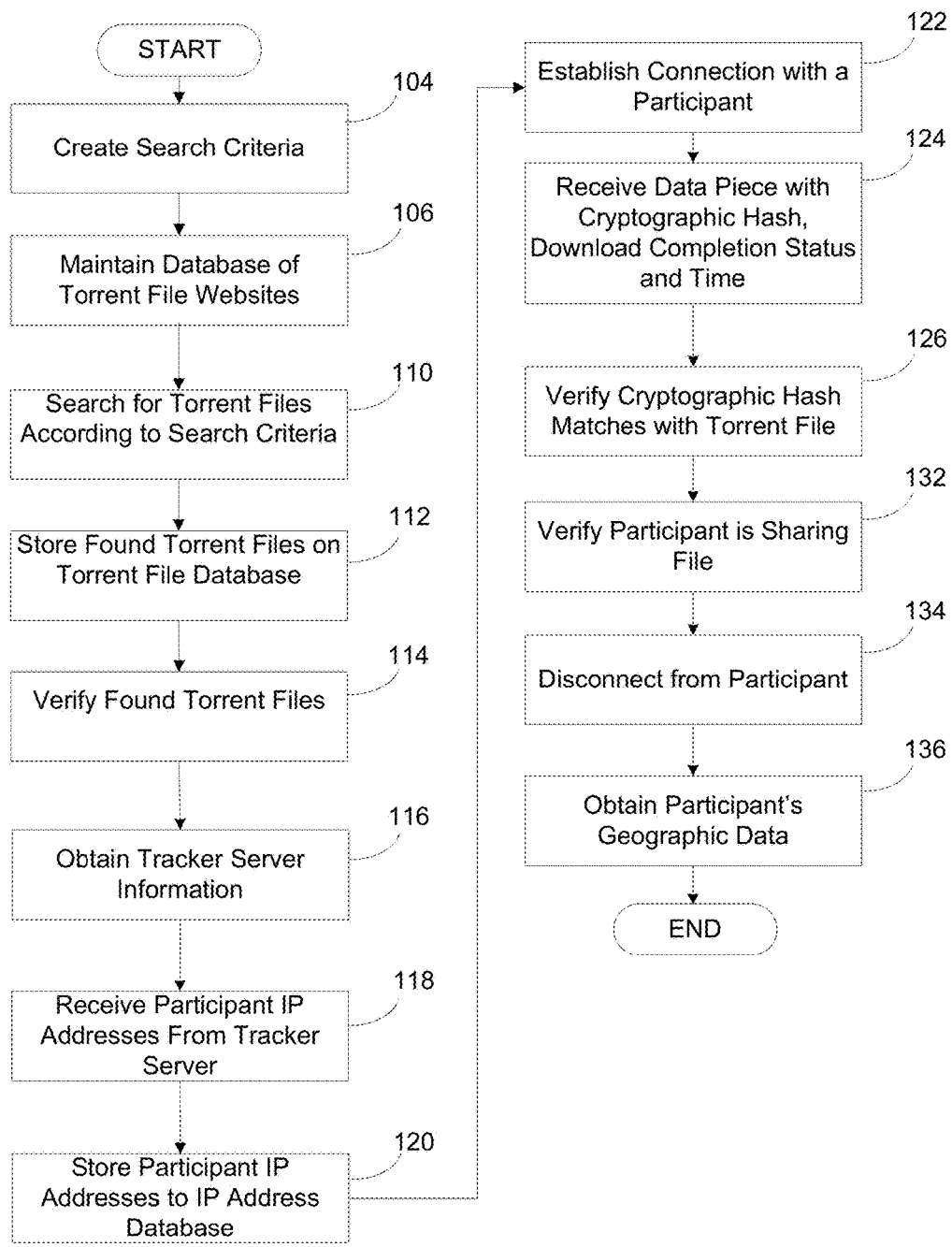
FIG. 1 illustrates a flowchart of an exemplary method in accordance with one or more embodiments of the present invention.

FIG. 1 illustrates a flowchart of an exemplary method in accordance with the system and method for terminating copyright infringement by BitTorrent users described herein. The copyrighted work is typically a movie, music, books, or software, but can be anything copyrightable that can be expressed in a computer media file. Typically copyright infringers use BitTorrent as a method of obtaining copyrighted works that may otherwise be bought for monetary value. To use BitTorrent to make a media file available to the public, a small sized torrent descriptor file (torrent file) is first created. The torrent file is distributed by conventional means such as through the web using the client-server model. Torrent files are typically published on websites or elsewhere.

In some embodiments of a system and method for terminating copyright infringement by BitTorrent users, a computer system executes instructions for a method stored on a computer-readable medium. In an exemplary embodiment, the computer system runs a Linux based operating system with the instructions written in a combination of C and Python programming languages. A search criteria based on a copyrighted work is created at step 104. The search criteria are created to find torrent files corresponding to media files containing the copyrighted work. The search criteria include at least a predetermined set of keywords based on a type of content of the copyrighted work. For example, to find torrent files corresponding to the movie "Gladiator," a sample search criteria may contain file name restrictions such as "Gladiator 2000 avi full 1080p." Such file name restrictions would look for torrent files with those words in its file name. The "2000" attempts to narrow the search to movies released in the year 2000. The "avi" attempts to find only media files with the .avi extension. The "full" attempts to exclude movie trailers and other shorted files. The "1080p" attempts to find movie files with a 1080p resolution quality. The search criteria may also include other criteria such as media file size to look through the "info" sections of torrent files.

In some exemplary embodiments, the search criteria include a predetermined set of keywords based on a type of content of the copyrighted work. For example, a predetermined set of keywords may be "RAZOR RELOADED SKIDROW" when the type of content of the copyrighted work is computer game software. RAZOR, RELOADED, and SKIDROW are included in the predetermined set of keywords because they are the names of well known, unauthorized, and illegal publishers of computer game software. These keywords are typically included in torrent file names for media files containing their published content.

A database of at least one torrent file website is maintained at step 106. Ideally, a list of all known or popular websites that publishes torrent files will be stored in a database. Popular websites include dedicated torrent file servers that allow participants to conduct searches with a browser interface and forums that allow participants to post torrent files for other participants to download.

Each of the torrent file websites are searched for a torrent file according to the search criteria at step 110. This may be accomplished using a number of well known web scraping methods which extracts information from websites. Such web scraping methods include HTML parsers and data mining algorithms. If the torrent file has been previously found, it will be ignored to prevent duplicates. In some embodiments, after every set period of time, each of said torrent file websites is re-searched again for a torrent file according to said search criteria. The torrent file found is stored to a torrent file database at step 112.

The torrent file is verified to correspond to a media file containing the copyrighted work at step 114. This verification may be automatically accomplished through an algorithm, manually by an administrator (or user), or a combination of the two. The most error proof method of verifying a torrent file is to download the entire media file and then viewing it manually by an administrator. By convention, the name of a torrent file has the suffix .torrent. This torrent file contains metadata about the files to be shared and about the tracker server, which is a computer that coordinates the file distribution. Torrent files have an "announce" section, which specifies the URL of the tracker server, and an "info" section, containing suggested names for the files, their lengths, the piece length used, and a cryptographic hash code for each piece. The metadata, such as the "info" section and the "announce" section, in the torrent file, may be entered into an algorithm to automatically verify the torrent file. A web interface may also be configured to allow the administrator (or user) to view each torrent file and its metadata manually to verify.

Tracker server information is obtained from the torrent file at step 116. The metadata of the torrent file specifies the URL of the tracker server. The tracker server is a server that coordinates the communication between peers using the same torrent file to download the media file. The tracker server maintains information about all peers using the torrent file including their IP addresses to allow peers to connect to one another. An Internet Protocol Address (IP address) is a numerical label assigned to each device participating in a computer network that uses the Internet Protocol for communication. The IP addresses of all the peers (i.e. participant IP addresses) currently connected to the torrent file, generally a plurality of addresses, are received at step 118. These participant IP addresses are stored into an IP address database at step 120. In some embodiments, after a set period of time, the participant IP addresses may be updated by receiving a new set of participant IP addresses from the tracker server. The web interface, described with respect to FIG. 3A, may also be configured to allow the administrator (or user) to view the participant IP addresses stored on the IP address database.

An attempt is made to establish connection with a participant using a participant IP address selected from the plurality of participant IP addresses at step 122. A request is sent for a data piece to the participant with the participant IP address selected. If successful, the participant will send back the data piece. Each data piece is protected by a cryptographic hash contained in the torrent descriptor. The cryptographic hash is an algorithm that maps large data sets to small data sets of a fixed length for the purpose of detecting duplicate records. The cryptographic hash ensures that any modification of the piece will be detected, and prevents both accidental and malicious modifications of any of the pieces. If a peer starts with an authentic copy of the torrent file, it can verify the authenticity of the entire file it receives. The data piece is received with a cryptographic hash from the participant at step 124. The cryptographic hash will typically use the hash function SHA-1 or MD5, but could be any other suitable hash function. The cryptographic hash is verified to correctly match with the torrent file at step 126.

A download completion status is also received from the participant and a corresponding capture time at step 124. The participant will send information that includes the participant's current download completion status, which indicates how many data pieces that the participant has finished downloading. When the download completion status is received, the current time is recorded as well.

The participant is verified to be sharing the media file at step 132. In some embodiments, receiving the data piece from the participant with a verified cryptographic hash, along with a significant Download Completion Status, is enough evidence to verify that the participant is sharing the media file using the torrent file.

The participant is disconnected at step 134. After receiving the data piece with the cryptographic hash and the download completion status from the participant, nothing further is required from the participant.

The geographic data of the participant is obtained based on the participant IP address at step 136. The participant IP address conveys a wealth of information about the participant's identification and location. A number of well known databases exist to correlate any IP address with its corresponding information. The participant's zip code, city, state, longitude, latitude, and median income of residential area, and internet service provider (ISP) may be obtained by searching one of these databases for the participant IP address.

In some embodiments a web interface may be configured to allow the administrator (or user) to view the participant's geographic data such as the participant's zip code, city, state, longitude, latitude, and median income of residential area. The web interface may also be configured to allow the administrator (or user) to sort the participants according to a title of the copyrighted work in the media file. The web interface may be configured to allow the administrator (or user) to sort the participants according to internet service provider based on the participant IP address.

The participant may be associated to a legal jurisdiction based on the participant's geographic data, e.g. based on the participant's zip code. In some embodiments, legal remedy may then be pursed for all participants of a particular jurisdiction. For instance, the owners of the copyrighted work may initiate a copyright infringement lawsuit against any participant verified to have been sharing the media file, and may group the lawsuits for multiple participants of the same legal jurisdiction. In addition, Digital Millennium Copyright Act (DMCA) takedown letters may be issued to the ISPs. In general, legal remedies may be pursued by Law Firms, for instance, that are part of an enforcement apparatus. Thus, an exemplary user of the systems and methods of the present invention is a member of a law firm.

Figure 2:
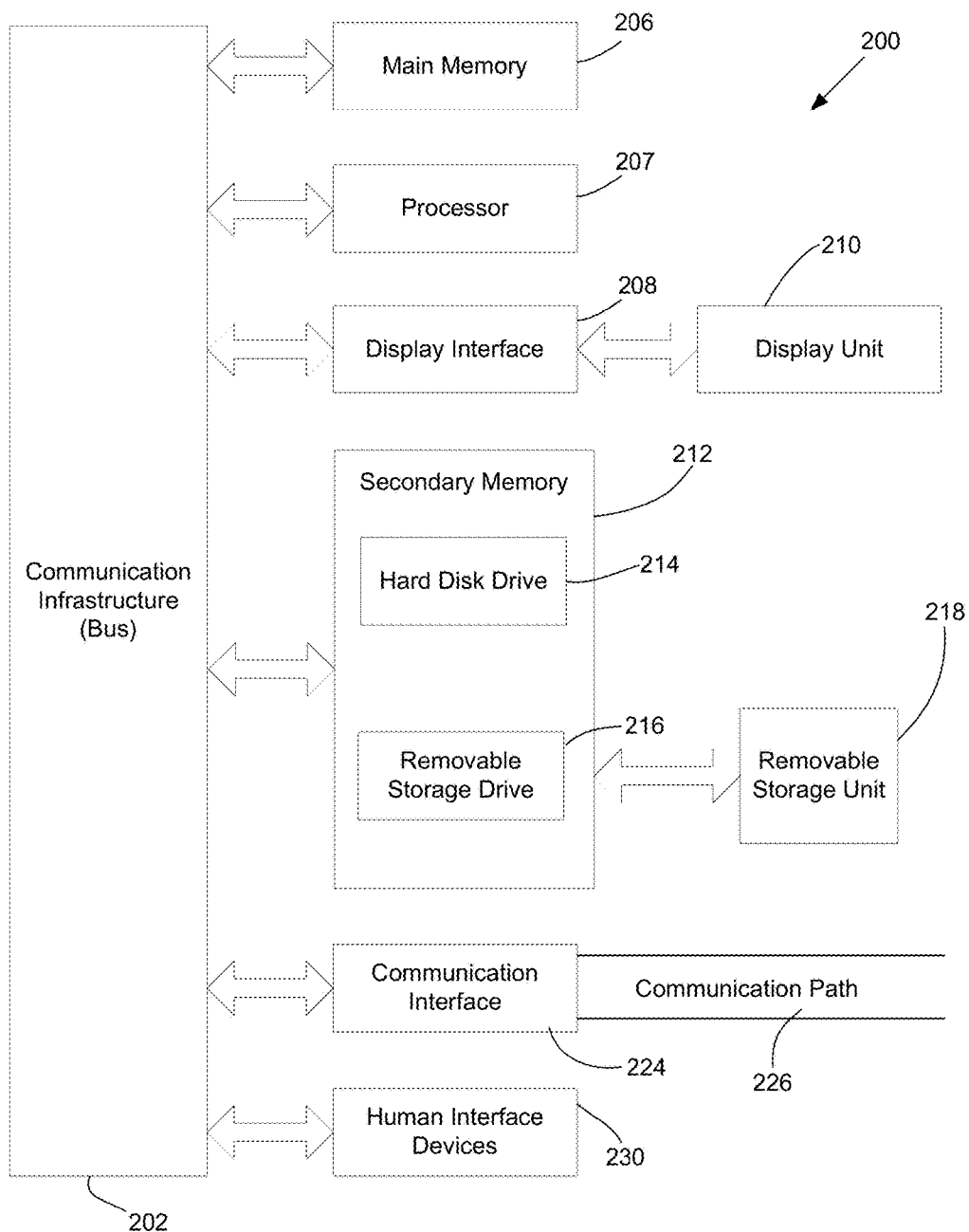
FIG. 2 illustrates a computer system in accordance with one or more embodiments of the present invention.

FIG. 2 illustrates a computer system in accordance with the system and method for terminating copyright infringement by BitTorrent users described herein. A general-purpose computer and peripherals, when programmed as described herein, may operate as a specially programmed computer 200 capable of implementing one or more methods, apparatus and/or systems of the solution described in this disclosure. A processor 207 may be coupled to a bi-directional communication infrastructure 202 such as communication infrastructure system 202. The communication infrastructure 202 may generally be a system bus that provides an interface to the other components in the general-purpose computer system such as the processor 207, a main memory 206, a display interface 208, a secondary memory 212, and/or a communication interface 224.

The main memory 206 may provide a computer-readable medium for accessing stored data and applications. The display interface 208 may communicate with a display unit 210 that may be utilized to display outputs to a user of the specially programmed computer 200. The display unit 210 may comprise one or more monitors that may visually depict aspects of the computer program to the user. The main memory 206 and the display interface 108 may be coupled to the communication infrastructure 202, which may serve as the interface point to the secondary memory 212 and the communication interface 224. The secondary memory 212 may provide additional computer-readable medium resources beyond the main memory 206, and may generally function as a storage location for computer-readable instructions to be executed by processor 207. Either fixed or removable computer-readable media may serve as the secondary memory 212. The secondary memory 212 may comprise, for example, a hard disk 214 and a removable storage drive 216 that may have an associated removable storage unit 218. There may be multiple sources of the secondary memory 212 and systems implementing the solutions described in this disclosure may be configured as needed to support the data storage requirements of the user and the methods described herein. Numerous types of data storage devices may serve as repositories for data utilized by the specially programmed computer 200. For example, random access memory, read-only memory, solid-state storage, magnetic storage, optical or magnetic-optical storage, or any other available mass storage technology that provides a repository for digital information may be used.

The communication interface 224 may be coupled to the communication infrastructure 202 and may serve as a conduit for data destined for or received from a communication path 226. A network interface card (NIC) is an example of the type of device that once coupled to the communication infrastructure 202 may provide a mechanism for transporting data to the communication path 226. Computer networks such Local Area Networks (LAN), Wide Area Networks (WAN), Wireless networks, optical networks, distributed networks, the Internet or any combination thereof are some examples of the type of communication paths that may be utilized by the specially programmed computer 200. The communication path 226 may comprise any type of telecommunication network or interconnection fabric that can transport data to and from communication interface 224.

To facilitate user interaction with the specially programmed computer 200, one or more human interface devices (HID) 230 may be provided. Some examples of HIDs that enable users to input commands or data to the specially programmed computer 200 may comprise a keyboard, mouse, touch screen devices, microphones or other audio interface devices, motion sensors or the like, as well as any other device able to accept any kind of human input and in turn communicate that input to processor 207 to trigger one or more responses from the specially programmed computer 200 are within the scope of the system disclosed herein.

While FIG. 2 depicts a physical device, the scope of the system may also encompass a virtual device, virtual machine or simulator embodied in one or more computer programs executing on a computer or computer system and acting or providing a computer system environment compatible with the methods and processes of this disclosure. In one or more embodiments, the system may also encompass a cloud computing system or any other system where shared resources, such as hardware, applications, data, or any other resource are made available on demand over the Internet or any other network. In one or more embodiments, the system may also encompass parallel systems, multi-processor systems, multi-core processors, and/or any combination thereof. Where a virtual machine, process, device or otherwise performs substantially similarly to that of a physical computer system, such a virtual platform will also fall within the scope of disclosure provided herein, notwithstanding the description herein of a physical system such as that in FIG. 2.

The computer-readable medium stores computer-readable instructions. The processor 207 executes the computer-readable instructions to create a search criteria based on a copyrighted work. The search criteria are created to find torrent files corresponding to media files containing the copyrighted work. The search criteria include at least a predetermined set of keywords based on a type of content of the copyrighted work.

The processor 207 executes the computer-readable instructions to maintain a website database of at least one torrent file website. Ideally, a list of all known or popular websites that publishes torrent files will be stored in a database. Popular websites include dedicated torrent file servers that allow users to conduct searches with a browser interface and forums that allow users to post torrent files for other users to download.

In some exemplary embodiments, the processor 207 executes the computer-readable instructions to maintain a web interface for use by the administrator (or user). The web interface may be used for a variety of purposes such as to allow the administrator (or user) to manually set the search criteria. Some embodiments provide for a console interface for administrator's use with text commands.

The processor 207 executes the computer-readable instructions to search each of the torrent file websites for a torrent file according to the search criteria. This may be accomplished using a number of well known web scraping methods which extracts information from websites. Such web scraping methods include HTML parsers and data mining algorithms. In some embodiments, after every set period of time, each of said torrent file websites are re-searched again for a torrent file according to said search criteria. The torrent file found is stored to a torrent file database.

The processor 207 executes the computer-readable instructions to verify the torrent file as corresponding to a media file containing the copyrighted work. This verification may be automatically accomplished through an algorithm, manually by an administrator (or user), or a combination of the two. The most error proof method of verifying a torrent file is to download the entire media file and then viewing it manually by an administrator (or user). By convention, the name of a torrent file has the suffix .torrent. This torrent file contains metadata about the files to be shared and about the tracker server, a computer that coordinates the file distribution. Torrent files have an "announce" section, which specifies the URL of the tracker server, and an "info" section, containing suggested names for the files, their lengths, the piece length used, and a cryptographic hash code for each piece. The metadata, such as the "info" section and the "announce" section, in the torrent file, may be entered into an algorithm to automatically verify the torrent file. A web interface may also be configured to allow the administrator (or user) to view each torrent file and its metadata manually to verify.

The processor 207 executes the computer-readable instructions to obtain a tracker server information from the torrent file. The metadata of the torrent file specifies the URL of the tracker server. The tracker server is a server that coordinates the communication between peers using the same torrent file to download the media file. The tracker server maintains information about all peers using the torrent file including their IP addresses to allow peers to connect to one another. An Internet Protocol Address (IP address) is a numerical label assigned to each device participating in a computer network that uses the Internet Protocol for communication. A plurality of participant IP addresses of peers currently connected to the torrent file is received. The plurality of participant IP addresses is stored into an IP address database. The web interface may also be configured to allow the administrator (or user) to view the plurality of participant IP addresses stored on the IP address database.

The processor 207 executes the computer-readable instructions to attempt to establish a connection with a participant with an IP address selected from the plurality of participant IP addresses. A request is sent for a data piece to the participant with the selected IP address. If successful, the participant will send back the data piece. Each data piece is protected by a cryptographic hash contained in the torrent descriptor. The cryptographic hash is an algorithm that maps large data sets to small data sets of a fixed length for the purpose of detecting duplicate records. The cryptographic hash ensures that any modification of the piece will be detected, and prevents both accidental and malicious modifications of any of the pieces. If a peer starts with an authentic copy of the torrent file, it can verify the authenticity of the entire file it receives. The data piece is received with a cryptographic hash from the participant. The cryptographic hash will typically use the hash function SHA-1 or MD5, but could be any other suitable hash function. The cryptographic hash is verified to correctly match with the torrent file.

The processor 207 executes the computer-readable instructions to receive a download completion status from the participant and a corresponding capture time is recorded. The participant will send information that includes the participant's current download completion status, which includes information on how many data pieces that the participant has finished downloading. When the download completion status is received, the current time is recorded as well.

The processor 207 executes the computer-readable instructions to verify that the participant is sharing the media file. In some embodiments, receiving the data piece from the participant with a verified cryptographic hash, along with a non-zero download completion status, may be enough evidence to verify that the participant is sharing the media file using the torrent file.

The processor 207 executes the computer-readable instructions to disconnect from the participant. After receiving the data piece with the cryptographic hash and the download completion status from the participant, nothing further is required from the participant.

The processor 207 executes the computer-readable instructions to obtain the participant's geographic data based on the participant IP address. The participant IP address conveys a wealth of information about the participant's identification and location. A number of well known databases exist to correlate any IP address with its corresponding information. The participant's zip code, city, state, longitude, latitude, and median income of residential area, and internet service provider may be obtained by searching one of these databases for the participant IP address.

In some embodiments, the processor 207 executes the computer-readable instructions to configure a web interface to allow the administrator (or user) to view the participant's geographic data such as the participant's zip code, city, state, longitude, latitude, and median income of residential area. The web interface may also be configured to allow the administrator (or user) to sort the participants according to a title of the copyrighted work in the media file. The web interface may be configured to allow the administrator (or user) to sort the participants according to internet service provider based on the participant IP address.

The processor 207 executes the computer-readable instructions to associate the participant to a legal jurisdiction based on the participant's geographic data. The legal jurisdiction may be assigned based on the participant's zip code. In some embodiments, legal remedy may then be pursed for all participants of a particular jurisdiction. The owners of the copyrighted work may initiate a copyright infringement lawsuit against any participant verified to have been sharing the media file, and may group the lawsuits for multiple participants of the same legal jurisdiction.

Figure 3A:
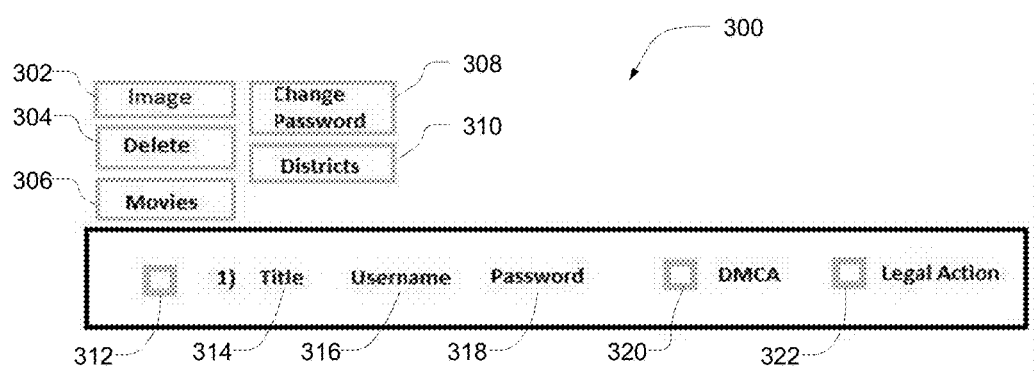
FIGS. 3A-B illustrate exemplary screenshots of an administrator interface in accordance with one or more embodiments of the present invention.
Figure 3B:
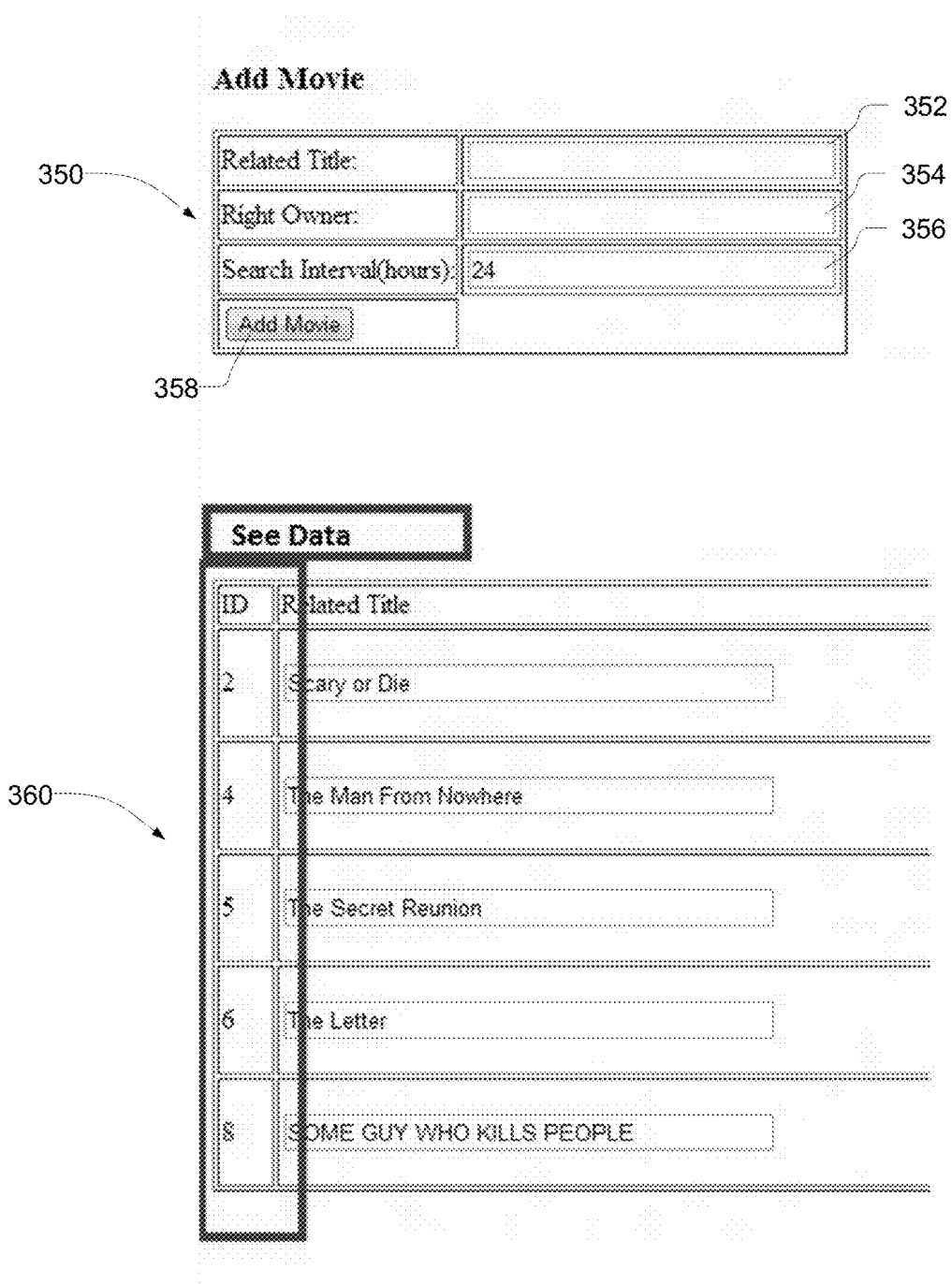

FIGS. 3A-B illustrate exemplary screenshots of an administrator interface in accordance with the system and methods for terminating copyright infringement by BitTorrent users described herein. Some embodiments of a system and method for terminating copyright infringement by BitTorrent users include maintaining a web interface for administrator 300. The web interface may be used for a variety of purposes such as to allow the administrator to manually set the search criteria. Some embodiments provide for a console interface for administrator use with text commands.

Module 300 represents an administrator interface display or part of a display. Administrator interface 300 provides a general interface for managing users and controlling copyrighted works being monitored. As illustrated, interface 300 comprises admin control functions such as "Image" 302, "Delete" function 304, "Movies" function 306, "Change Password" function 308, and "Districts" 310. The Delete function 304 may be configured to provide the administrator the ability to remove users (e.g. law firms) from the system. For instance, by checking check box 312 and activating Delete 304, the selected user is removed.

Movies function 306 provides the administrator the ability to add additional titles (i.e. copyrighted materials) into the database for monitoring. When activated, Movies function 306 launches the screenshots illustrated in FIG. 3B. FIG. 3B provides interface for the administrator to add new titles in section 350 and to view existing titles in section 360. For instance, section 350 includes "Related Title" field 352 for the administrator to add the title of a new recording to be monitored. The administrator may then enter the copyright owner in "Rights Owner" field 354 and the desired search interval in "Search Interval (hours)" field 356. The search interval corresponds to the frequency upon which the internet is searched for peer-to-peer downloading of the new title. Default is 24 hours. After the administrator is satisfied with the entries, the "Add Movie" button 358 may be clicked to enter the new title into the database. Thereafter, the new title appears in section 360, along with any other title previously entered.

Returning to FIG. 3A, "Districts" function 310 provides for viewing and setting of US District Court districts for the users. "Title" 314 is the name of the user (e.g. law firm); "Username" 316 and "Password" 318 represent the firm's login information; check box "DMCA" 320 may be checked if the firm is authorized to issue DMCA takedown letters; and check box "Legal Action" 322 may be check if the firm is authorized to proceed with legal action in the appropriate US District Court.

Figure 4A:
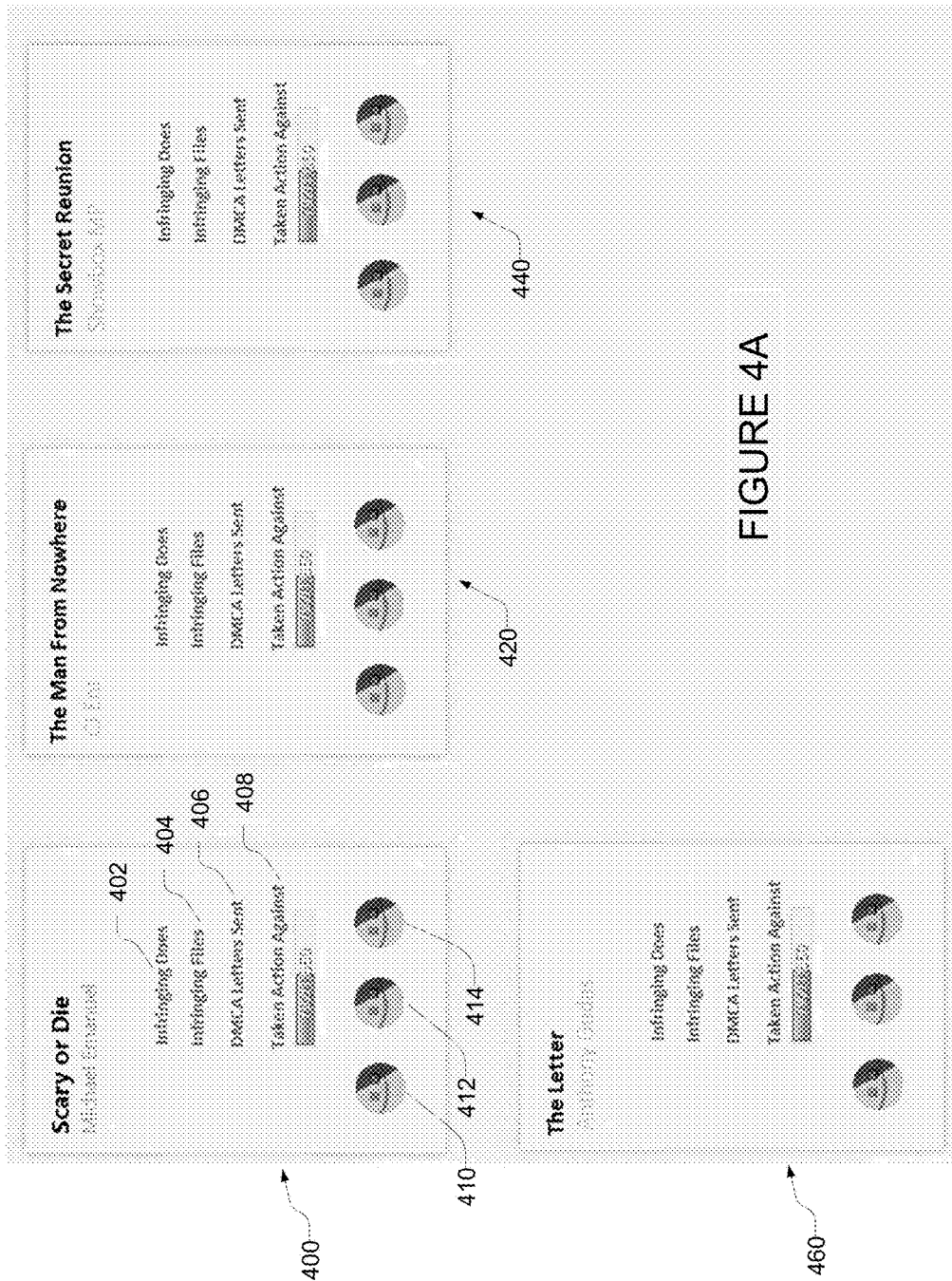
Figure 4B:
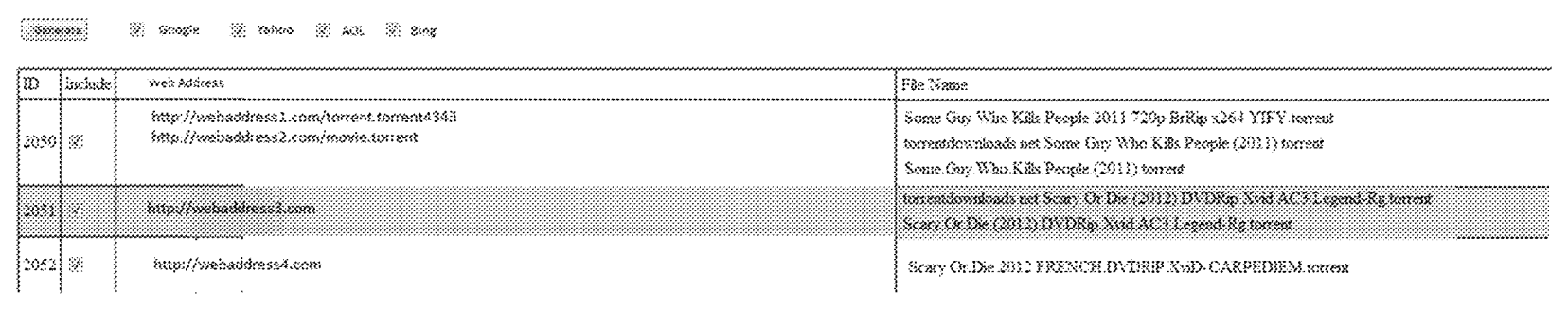
Figure 4C:
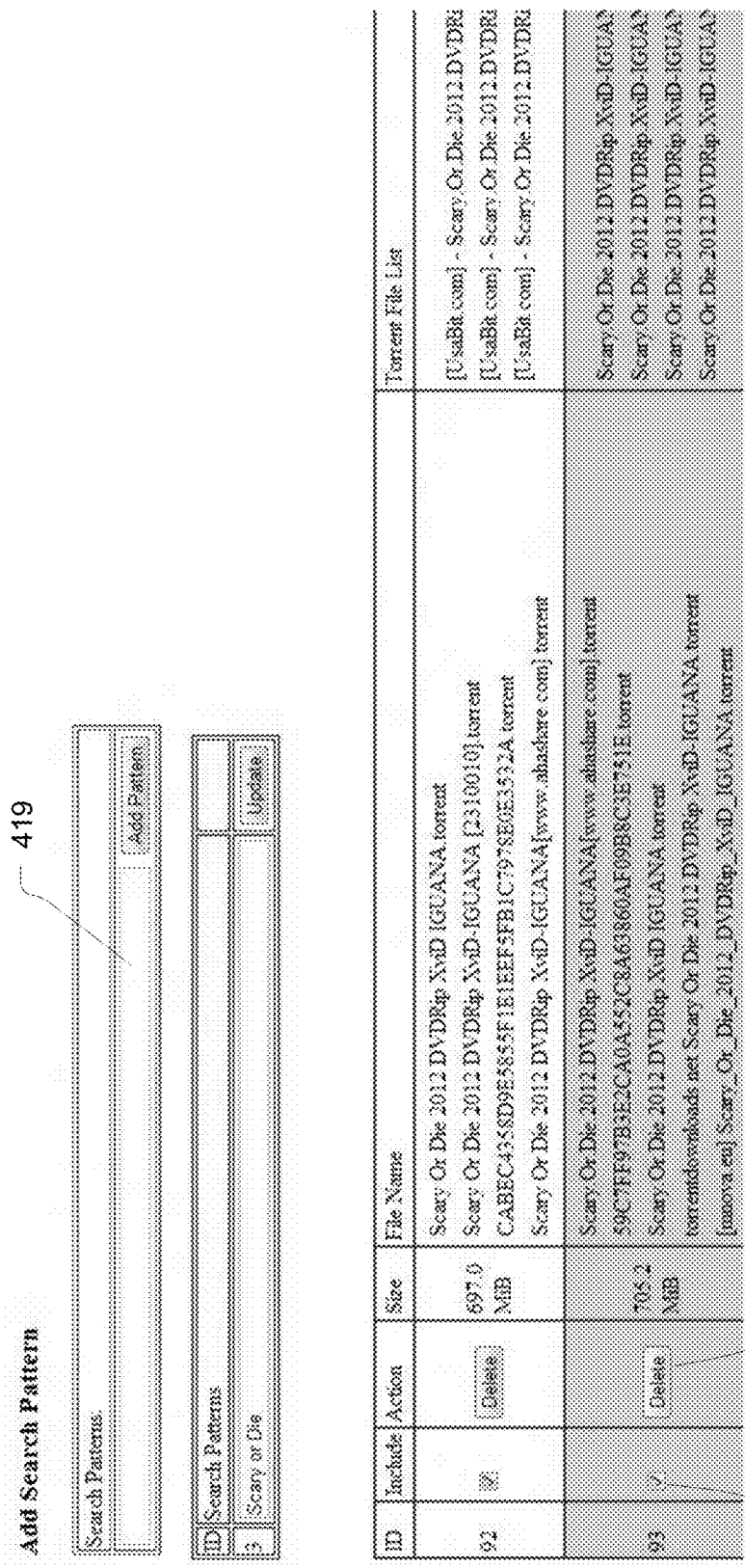

FIGS. 4A-C illustrate exemplary screenshots of the user interface in accordance with the system and methods for terminating copyright infringement by BitTorrent users described herein. FIG. 4A is a screenshot of the layout of the main screen which comprises several sections representing Titles (i.e. copyrighted materials) being monitored for copyright infringers. For instance, in the current illustration section 400 is for the copyrighted work "Scary or Die," owned by Michael Emanuel; section 420 is for "The Man From Nowhere," by C J Ent.; section 440 is for "The Secret Union," by Showbox MP; and section 460 is for "The Letter," by Anthony Gudas.

To facilitate review of the performance of the methods of the present invention, each section (e.g. 400, 420, 440, and 460) displays information representing summary of the tracking and enforcement process for each title. For instance, "Infringing Does" 402 displays the number of unauthorized users of the copyrighted material "Scary or Die"; "Infringing Files" 404 displays the number of torrent files affected by the infringing activities; "DMCA Letters Sent" 406 represents the number of DMCA takedown letters sent to the ISPs of the infringing participants; and "Taken Action Against" 408 displays the number of infringing participants that legal action have been initiated against.

In addition to the summary display, each section provides a plurality of interface elements for the user of the system of the present invention to dig further into the database. In the illustration of section 400, these interfaces are represented by the Packman symbols 410, 412, and 414. The system may be configured such that activation of Interface 410 results in display of a window showing web addresses where torrent files for the title are located, as illustrated in the sample screenshot of FIG. 4B. Interface 410 could be implemented as a pushbutton, a hyperlink, etc.

Similarly, activation of Interface 414 may result in display of a window showing the torrent files for the title, as illustrated in the sample screenshot of FIG. 4C. With the interface of FIG. 4C, the user (reviewer or agent) of this system could add search queries or patterns for the title in textbox 419, include or exclude files from the list to be monitored and/or managed, and delete files. To exclude a file, the user will need to uncheck the checkbox 417 and vice versa to include the file. A file may also be deleted from the list by selecting the "Delete" pushbutton 418.

Figure 5A:
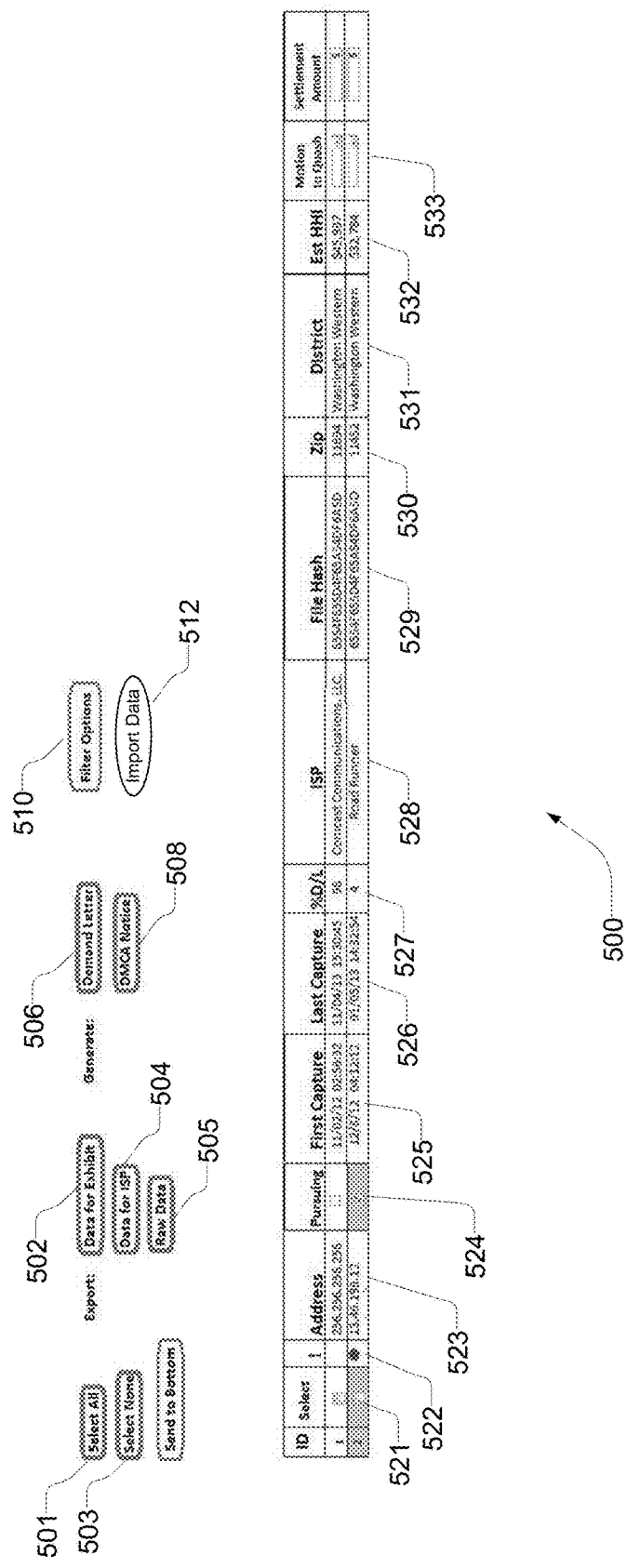

Similarly, activation of Interface 412 results in display of the "Does" page 500 illustrated in the screenshot of FIG. 5A. FIGS. 5A-D illustrate exemplary screenshots of the user interface to the infringer data in accordance with the system and methods for terminating copyright infringement by BitTorrent users described herein. In one or more embodiments of the present invention, the graphical interface 500 comprises critical information about the copyright infringers (i.e. Does) and a plurality of pushbuttons to enable manipulation of the data. For instance, important information for each infringer may comprise the following fields: "IP Address" 523; "First Capture" date and time 525; "Last Capture" date and time 526; percentage of torrent files downloaded (i.e. % D/L) 527; "ISP" 528; "File Hash" 529; "Zip Code" 530; US District Court with jurisdiction 531; and Estimated Household Income ("Est. HHI") 532. In addition, data for each Doe includes a dropdown menu 533 to documentation of status of "Motion to Quash," if any. The dropdown menu values may comprise values such as "None; Submitted; Approved; and Denied." The "Motion to Quash" field 533 provides for documenting whether or not an ISP filed a motion to quash a subpoena for records for the Doe infringer.

Figure 5B:
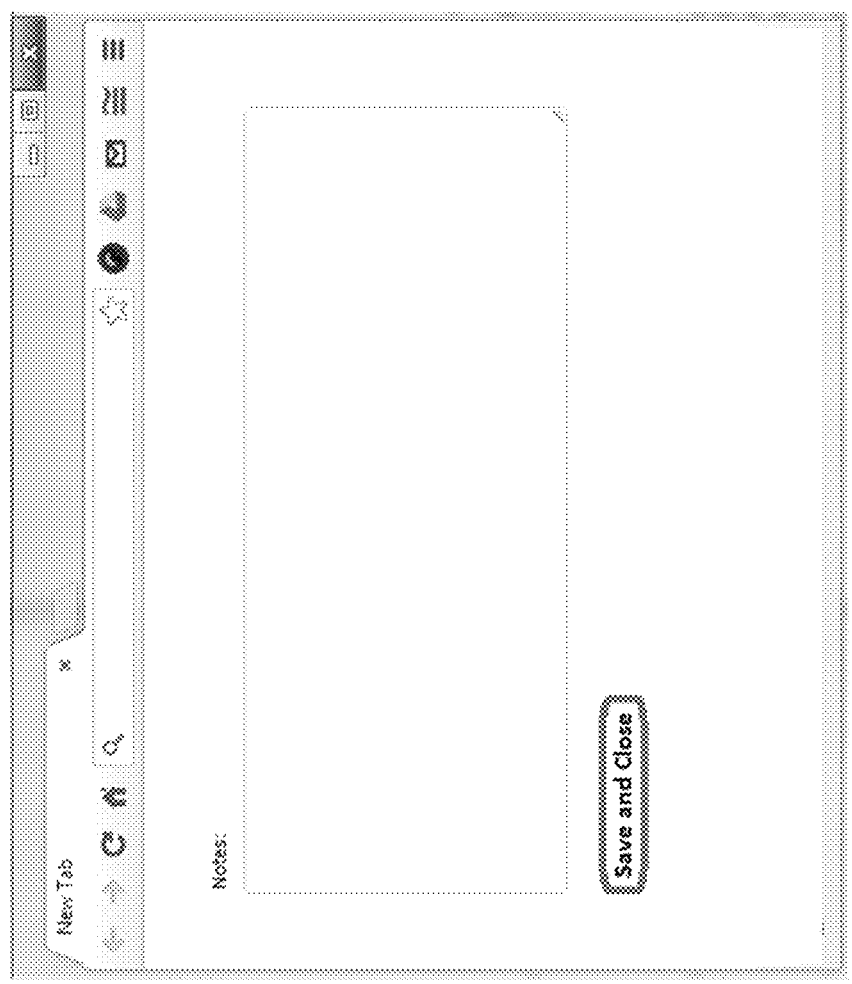

Interface 500 also includes checkbox 524 for each Doe infringer so that when checked, indicates legal action is being initiated against the Doe infringer. Also, the user may include notes about each infringer by clicking the IP Address field 523, which launches a screen to enter notes as illustrated in FIG. 5B. After entering the notes, a suitable symbol, e.g. a red dot, appears in field 522 labeled "!." Also, information for one or more Does may be managed by using pushbuttons 501, 502, 503, 504, 505, 506,508, 510, and 512.

The "Select All" pushbutton 501 allows for one-click selection of all the Does infringers for processing. When this button is activated, the "Select" field 521 is checked for all the Does infringers. Similarly, activating button "Select None" 503 deselects all the Does on field 521. Alternatively, instead of the all or nothing functionality of buttons 501 and 503, each individual Doe may be selected or deselected by selecting its check box 521. Other pushbuttons provide functionalities that are important for copyright enforcement. For instance, the "Data for Exhibit" 502 button generates the exhibit page illustrated in FIG. 5C. Such exhibit page includes all relevant information needed for evidence in a court proceeding to show infringing activity.

Similarly, "Data for ISP" button 504 generates information needed to be included in a Subpoena for records or for a DMCA takedown letter to the relevant ISP; "Raw Data" 505 generates a dump of the raw data in the database for the selected Does; "Demand Letter" 506 will generate a demand letter to the selected Does; "DMCA Notice" 508 generates the DMCA takedown letter to the ISP; Filter Options 510 opens an interface for selecting filter options to reduce the number of infringing Does displayed; and "Import" 512 provides for importation of data from an ISP. Table 1 is an exemplary illustration of a data table from an ISP for infringer information in accordance with an embodiment of the present invention. As illustrated in Table 1, the data typically comprises geographic information about the infringing Does.

TABLE 1

Sample ISP Provided Information

| IP Address | Date | First Name | Last Name | Address | Address 2 | City | State | Zip Code | Country | Tel | Email |
|---|---|---|---|---|---|---|---|---|---|---|---|
| 256.256.256.256 | 11/4/2013 15:30:45 | Jon | Doe | 8521 Summerset Dr. | Unit 2 | Plano | TX | 76114 | USA | N/A | jon@me.com |
| 13.46.196.12 | 1/5/2013 14:32:54 | Jane | Doe | 421 Euclid Ave | | Tempe | AZ | 85746 | USA | N/A | jane@me.com |

In one or more embodiments of the present invention, when Filter Options 510 is activated, the interface illustrated in screenshot of FIG. 5D is displayed. This interface allows the user to reduce the number of Does displayed on interface 500 by selecting the appropriate check boxes and/or entering date ranges in the spaces provided in FIG. 5D.

In yet another embodiment of the present invention, the system determines the identity of any other participant with which a particular participant uploaded or shared files with. The systems and methods of the present invention may accomplish this by periodically checking each participant in the IP address database and determining if they're still connected to the peer-to-peer network.

Figure 6:
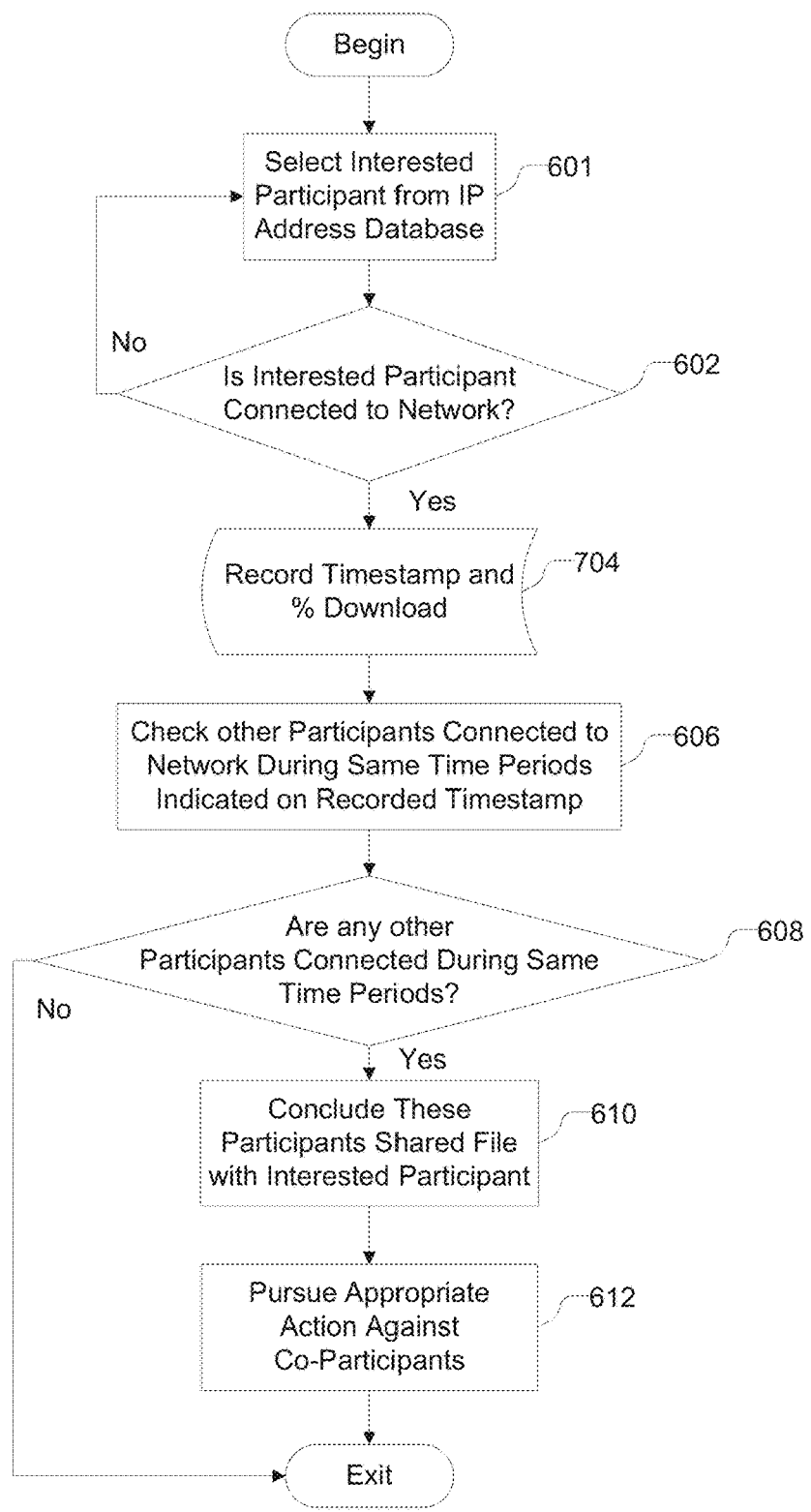
FIG. 6 is an illustration of the process determining participants in the BitTorrent network that shared files together in accordance with one or more embodiments of the present invention.

FIG. 6 is an illustration of the process determining participants in the BitTorrent network that shared files together in accordance with systems and methods of the current invention. As illustrated, in step 601 an interested participant is selected by choosing a participant IP address from the IP Address Database. The system then checks if the interested participant is connected to the BitTorrent network in step 602 and if a determination is made that the interested participant is not connected to the network, the systems returns to step 601 to select another participant, until all the participants are sampled. However, if a time a determination is made that a participant is connected to the network; the system proceeds to step 604 to record a timestamp, and checks and records the percentage of the download the interested participant has completed. Following this process at step 604, the system may collect the data presented in Table 2 below for the interested participant:

TABLE 2

Download History

| CAPTURE TIME | % DOWNLOAD |
|---|---|
| 10/3/2012 14:37:16 | 30 |
| 10/3/2012 20:37:16 | 40 |
| 10/5/2012 6:05:11 | 75 |
| 10/5/2012 23:55:32 | 100 |

From the data in Table 2 above, it is possible to conclude that the interested participant was downloading the file between the dates of Oct. 3, 2012 and Oct. 5, 2012, and that the download took at least 2.38 days to complete.

In step 606, a check is made of one or more of the remaining participants in the IP address database to determine those participants connected to the BitTorrent network during same time periods indicated in the recorded timestamp of step 604. For instance, in step 608 the system takes an IP address from the IP address database and checks its recorded timestamp to see if it corresponds to the time stamp of the interested participant. If no, the next IP address is sampled, until a determination is made of all those other participants connected to the network at the same time as the interested participant. In step 610, the other participants determined to be connected to the network at the same times as the interested participant are labeled as co-participants and possibly those who shared files with the interested participant. And in step 612 appropriate legal actions may be pursued against the co-participants.

In yet another embodiment of the present invention, the system determines specific information about the computer of the participant that is sharing files in the network, even if that participant is located behind a firewall. The systems and methods of the present invention may accomplish this by using passive fingerprinting techniques, the methods of which are commonly known in the arts. Passive fingerprinting is based on analyzing the TCP data that the computer is sending while responding to queries, for instance in step 122. It's important that the process is done passively and by using the data already being sent to prevent violation of any governmental regulations. Two methods are described herein for passive fingerprinting: TCP Packet Sniffer; and Analyzing Clock Skew of the Remote Device.

In one or more embodiments of the present invention, a simple TCP packet sniffer method is implemented for determining specific information about the computer of the participant that is sharing files in the network. The method mimics the functionality described in http://lcamtuf.coredump.cx/p0f3/README: "P0f is a tool that utilizes an array of sophisticated, purely passive traffic fingerprinting mechanisms to identify the players behind any incidental TCP/IP communications (often as little as a single normal SYN) without interfering in any way."

In another embodiment of the present invention, a method of analyzing the Clock Skew of the remote computer is implemented for use in determining specific information about the computer of the participant that is sharing files in the network. In this embodiment, the TCP timestamps from incoming connections are analyzed to measure the devices clock skew and thereby fingerprinting the physical device. The method of passive fingerprinting mimics the functionality described in the publication: "Remote physical device fingerprinting" by Tadayoshi Kohno et al., May 25, 2005, http://homes.cs.washington.edu/~yoshi/papers/PDF/KoBrCl2005PDF-Extended-lowres.pdf.

One or more embodiments of the present invention provide for a system and method that searches, finds, and identifies files and information on peer-to-peer networks. One embodiment creates search criteria and maintains a database of the resulting file locations. Search criteria may comprise any distinct target information, including but not limited to keywords in filenames, particular bits of data in a file (e.g., a segment from a movie or a song, text and images in a file, file-type extensions, and the like). In some embodiments, the system of the present invention stores reference files, from which these criteria for surveying networks for target files are derived, and may maintain a database wherein reference files are categorized and cataloged based on various descriptive attributes. For example, the system may store a torrent file to a torrent file database and categorize the file based on various descriptive attributes associated with said file; a list of known networks and nodes in which to perform surveillance may also be maintained.

Centralized Method

One or more embodiments of the present invention use the centralized method for collecting participant information. Under the centralized method, the System mimics the functionality of a Client. It gets the trackers' address from the Torrent File and requires the tracker to get the IP Addresses of peers (Clients) as a response. The tracker also saves the System's IP Address and provides it to other peers (Clients). The System builds a connection based on the IPs from the tracker's response. It confirms the other client is sharing the specific file by checking the Hash Tag sent by other peers, and records their IP Addresses and the time that the connection was established. This recording process preferably occurs in real time. The System then waits for the other peer (Client) to send the number of pieces it has. This number is compared with the total number of pieces extracted from the Torrent File (aka "the File") and enables the System to know what percentage of the File that other Client has downloaded, and specifically which pieces the other Client has yet to download.

As described above, one or more embodiments of the invention connects to the peer, exchanges information confirming the existence of a particular file of interest, then disconnects from the peer after this information is received. The process is repeated with the next available peer (Client). If a peer attempts a second connection with the System, the System will record an additional log for this IP Address and will update the percentage that is already recorded, and the last captured time. All of the IP Addresses, times connection was established, and download percentages are stored into the IP Address Database and filed by location information.

Data collection in the preferred embodiment of the Centralized Method is generally provided in FIG. 1. As illustrated, the System scrapes forums and websites to find Torrent Files and extracts the web address of the Torrent File(s). It then downloads the Torrent File(s) to a database accompanying the System. This process is the same as if a human obtained the Torrent File (e.g., when a user initiates the download of a torrent file or analogous object from a web-based portal; or when the local client on an individual user's machine acquires a torrent). For each Torrent File, the System emulates the process of becoming a Client and seeks to build connection(s) with other Clients. Once the System makes an exchange of data and confirms the IP Address is downloading or uploading pieces of the File, it disconnects from the Client(s). The System extracts the file size of the File and is able to display it in the Interface. File size information is valuable in differentiating potential trailers or previews from actual Torrent File(s).

Thus, the System works analogously like a Client. It gets the trackers' address from the Torrent File and requires the tracker to get the IP Addresses of peers (Clients) as a response. The tracker also saves the System's IP and provides it to other peers (Clients). The System builds a connection based on the IPs from the tracker's response. It confirms the other client is sharing the specific file by checking the Hash Tag sent by other peers, and records their IP Addresses and the time that the connection was established. This recording process is preferably done in real time.

The System then waits for the other peer (Client) to send the number of pieces it has. This number is compared with the total number of the pieces extracted from the Torrent File and enables the System to know what percentage of the File that other Client has downloaded. As soon as the System receives this information it disconnects with this peer. Then, the System gets ready to repeat this process with next available peer (Client). If a peer attempts a second connection with the System, the System will record an additional log for this IP Address and will update the percentage that is already recorded, and the last captured time. All of the IP Addresses, times, and download percentages are stored into the IP Address database, and filed by location information, so an Administrator can export the information as a report or in the form of digital data.

In one or more embodiments of the present invention, the system analyzes a file according to designated parameters, such as whether the file is a torrent file utilizing a Distributed Hash Table (DHT) mechanism to augment file and information sharing, and if the file is determined to have the required features, then a series of steps is initiated to access and monitor one or more networks to catalog information such as the identity and activity of those users (e.g., nodes, peers, clients) sharing that file. If verified that a DHT mechanism is used, the system will locate at least a single peer on the network (e.g., the Internet) that is making the file available. After discovering that the peer is in fact utilizing a DHT, it is able to ping the individual node (i.e. the peer) and receive back many more peers who are also utilizing a DHT to augment file & information sharing. The process will then be repeated with these newly discovered peers until all of the peers have been revealed to the system, resulting in a plurality of newly discovered peers, all of which are using a DHT to augment file & information sharing. Each of these peers corresponds to a unique and encrypted HASH ID. Each of the HASH IDs corresponds to a newly discovered peer, and all of these Hash IDs are decrypted, resulting in a plurality of IP Addresses corresponding to the aforementioned HASH IDs, this plurality of IP Addresses is then stored in an IP Address database. Thereafter, each IP address in the resulting plurality of IP Addresses is pinged, and each one responds with a plurality of HASH IDs which again correspond to IP Addresses sharing the file. The pinging process is repeated until a satisfactory amount IP Addresses are deemed found; for example, when after multiple iterations of the process no new IP Address are being returned. In preferred embodiments, the pinging process is repeated intermittently (hours, days, or weeks, etc.) to search for new IP addresses and other data in the network as well as to determine the continued presence of previously acquired IP addresses and other data.

The system also receives a download completion status from each participant and records a corresponding capture time and verifies that the participant is sharing the media file. The system obtains other data and metadata (e.g., geographic data, personal identifying information, user system attributes, etc.) of each participant based on, for example, the participant's IP Address and/or the HASH ID of the node. The IP and geographic information about a user, once collected, may enable further analysis and collection of user data including but not limited to demographic analysis, audience analysis, and piracy analysis.

Marketing, advertising, and branding techniques may all be refined using the resulting analysis. Piracy analysis may be used to improve financial models used in the movie and insurance business, or be used for legal remedy in the form of DMCA takedown letters, educational messages delivered via the internet, and/or other legal action. Advanced antipiracy measures may also be implemented.

Decentralized Method

The structure of a Distributed Hash Table may be split up between a multitude of roles. The primary part being a Keyspace (Key), often times consisting of a 160-bit string known in the arts as a SHA-1 Info Hash (or SHA256, or any other similar encryption). This Hash can often times represent the IP Address or the physical location of a node. A Partitioning Scheme is responsible for splitting ownership amongst the participating nodes. An Overlay Network connects the nodes allowing the discovery of each node represented in the Keyspace.

Typical use of a Distributed Hash Table for storage and retrieval purposes may operate as follows. The keyspace (key) would consist of an encrypted string (SHA1, SHA256, etc) representing the location of a client. To store a File or Data, the Client will also generate a 160-bit encrypted SHA-1 hash (or SHA256, etc.) unique to the File or Data. A message is sent to any or a plurality of node participants in a DHT using a put command referencing the File's (or Data's) unique 160-bit encrypted SHA-1 (or SHA256, etc.). The message is sent and diffused throughout the DHT until it reaches the node responsible for the Key value as determined by the Partitioning Scheme. This node will then store the data corresponding to the key. Any other client can then retrieve the File or Data by referencing its 160-bit SHA-1 hash, and asking any DHT node to find the data associated to it using a get command. This message will once again be diffused and routed through the Overlay Network until it reaches the node responsible for the File or Data, which will then reply with requested File or Data.

With the intention of reducing network traffic, store and request operations are typically limited to a set number of the closest nodes, typically between ten and twenty. However, in some embodiments, each node in the DHT may communicate with any set number of other nodes, or an unlimited number of other nodes on the Overlay Network.

Partitioning in the decentralized method can generally be described as follows. Most DHTs use a hashing mechanism that defines an abstract notion of distance between Keys and/or Nodes (often times unrelated to actual geographical distance). Each Node on the overlay typically has its own unique identifier ID. In a circular configuration, each Node represents a subsequent key, and the coordinate, (Node1, Node2), represents the distance traveling clockwise between two Nodes. An embodiment may use the XOR distance metric, i.e. the two node ID's or a node ID and a Key are XORed and the result is the distance between them.

Each Node maintains a communication link between one location and another for the purpose of transmitting and receiving digital information. These links form the Overlay Network. A node picks its neighbors according to a predefined structure, typically determined by the network topology or the Partitioning Scheme.

Every node maintains a routing table of known good nodes. The nodes in the routing table are used as starting points for queries in the DHT. Nodes from the routing table are returned in response to queries from other nodes. Each node only needs to keep record of, and coordinate with a few other nodes in the system—so that only a limited amount of work is needed for change in membership.

If any nodes in the bucket are known to have become bad, then one may be replaced by a new node. If there are any questionable nodes in the bucket that have not been seen during a predetermined amount of time, the least recently seen node is pinged; if the pinged node responds then the next least recently seen questionable node is pinged until one fails to respond or all of the nodes in the bucket are known to be good. If a node in the bucket fails to respond to a ping, the system may try one more time before discarding the node and replacing it with a new good node. In this way, the table fills with stable long running nodes.

Data collection may proceed as follows. In a first step, a client obtains the Info Hash of the File or Data it is interested in discovering through a search or surveillance campaign. The Client may create this Info Hash by creating it through a hashing process from the file, or it may be provided to the Client manually, or by another commonly known means. In one or more embodiments, any unique file will have its own DHT responsible for only the particular File, indicated by the Info Hash of the File. This DHT will act as a lookup service for the File, and may be independent from other DHTs which provide lookup services for their respective Files.

In one or more embodiments, to access the DHT of a File consists of a Client hashing its own unique location identifier, which may be in the format of an IP Address, a SHA256 delimiter, SHA1 160-bit delimiter, or any other unique identifier. The Client then performs a lookup of the resulting location Key within the DHT to determine the closest nodes to the Key ID (in accordance with the partitioning schema referenced above). It then contacts those nodes with a request to store or return the associated File or Data. When a node wants to find peers for a file, it uses the distance metric to compare the info hash (SHA1) of the file with the IDs of the nodes in its own routing table. It then contacts the nodes it knows about with IDs closest to the info hash and asks them for the contact information of peers who currently possess the file. If a contacted node knows about peers for the file, the peer contact information is returned with the response. Otherwise, the contacted node must respond with the contact information of the nodes in its routing table that are closest to the Info Hash of the file. In one embodiment, the system "bootstraps" its way into a DHT by knowing the location Key, or IP Address of one node, and following this, is able to access the Distributed Hash Table of the file, and diffuse from peer to peer gaining information on other nodes for every new node it discovers. Each peer returns a list of the peers it knows that are closest to the desired Node ID. The requesting node contacts those peers, reaching successively closer peers until it finds all Clients who are accessing or have accessed the Distributed Hash Table for a File or Data.

In one or more embodiments, the returned information, or Key values may be decrypted, resulting in an IP Address or plurality of IP Addresses of other Clients in the DHT. This IP Address or plurality of IP Addresses may then be stored in the System's IP Address database for future analysis. In one embodiment, the System may ping a Key corresponding to a single encrypted IP Address, and ask that Peer if it possesses the information corresponding to a multitude of Info HASHs for a plurality of files. Mimicking a search lookup that will result in the System checking if the Peer possesses any or all of the Files the System is checking for.

Search and Categorization

In one or more embodiments of the present invention, the system executes computer instructions to scrape (i.e., systematically survey) forums and websites for Torrent Files and extract the web address of the Torrent File(s). Identified target files (i.e. Torrent Files) are then download to one or more databases.

In a next step, the System catalogs the files based on name and Hash ID, and it may assign attributes to each file based on various criteria. The system then generates a look-up reference table or other log where general and specific information is stored which can serve as markers that assist in correlating target files with category data. For example, after a file is identified by keyword, e.g. movie titles or phrases from movie titles, then these and other features of the target file are analyzed for the presence of markers and then categorized as appropriate. If in this example the name of the file contains keywords "Dexter, Entourage, or Game of Thrones, The Wire," then these are identified as intellectual property owned by Home Box Office, Inc. (HBO); and if the name of the file contains keyword "Dexter," or "The Wire," then a further category attribute may be assigned, for example, TV Drama and/or TV Thriller; and if the name of the file contains keyword "Entourage," then attribute TV Comedy; and if "Game of Thrones," then TV Adventure; and so on. Table 3 is a tabular representation of an exemplary data stored in the memory of a computing device or output in a report.

TABLE 3

Category Assignments for acquired files, based on markers and attributes.

| Hash ID | Name of File | Attribute 1 | Attribute 2 | Attribute 3 | Attribute 4 |
|---|---|---|---|---|---|
| BD39B95D0F8 AEF7BE5E8FC2 DD7E7839B8D9 B9C38 | Dexter.DVDRip.torrent | HBO | TV | Drama | Thriller |
| FA03713349516 539BDB345680 FF733967B0179 FC | Game of Thrones Season Finale.torrent | HBO | TV | Adventure | |
| 60EBACB47ED 70DAE209BB4 B3BC33E950C0 04BA77 | Entourage.Season2.torrent | HBO | TV | Comedy | |
| C0AEF087966E 208669FB13CB 28A653EE17C5 336C | TheWire.torrent | HBO | TV | Drama | Thriller |

Marketing, Branding and Advertising Using Torrent File Information

Because the systems and methods of the present invention can harness data from the Distributed Hash Tables of torrent files to find other users (peers) who are located in a close geographic area to the original user, these data can be correlated with proximity information, user identifying information and consumer activity (such as consumption of movies and music content, whether legitimate or infringing), and any other useful secondary data. This type of information is valuable in advertising and marketing, and customer lists can be generated from the results, including lists organized by location, age group, consumer preferences, and the like. The invention may use different algorithms for this type of data mining depending on whether or not geographic data is available, such as zip code, city, and state, and also depending on network structure, since nodes in proximity to each other under many P2P paradigms tend to be in relatively close geographic proximity as well (e.g., in the same city or state). Advantageously, the System can instruct each node to attempt to download target information from as many sources as possible in an effort to increase speed. One method for accomplishing this is to begin by accessing a number of nodes simultaneously, and then diffusing through the swarm of users while collecting data from each one along the way.

Figure 7:
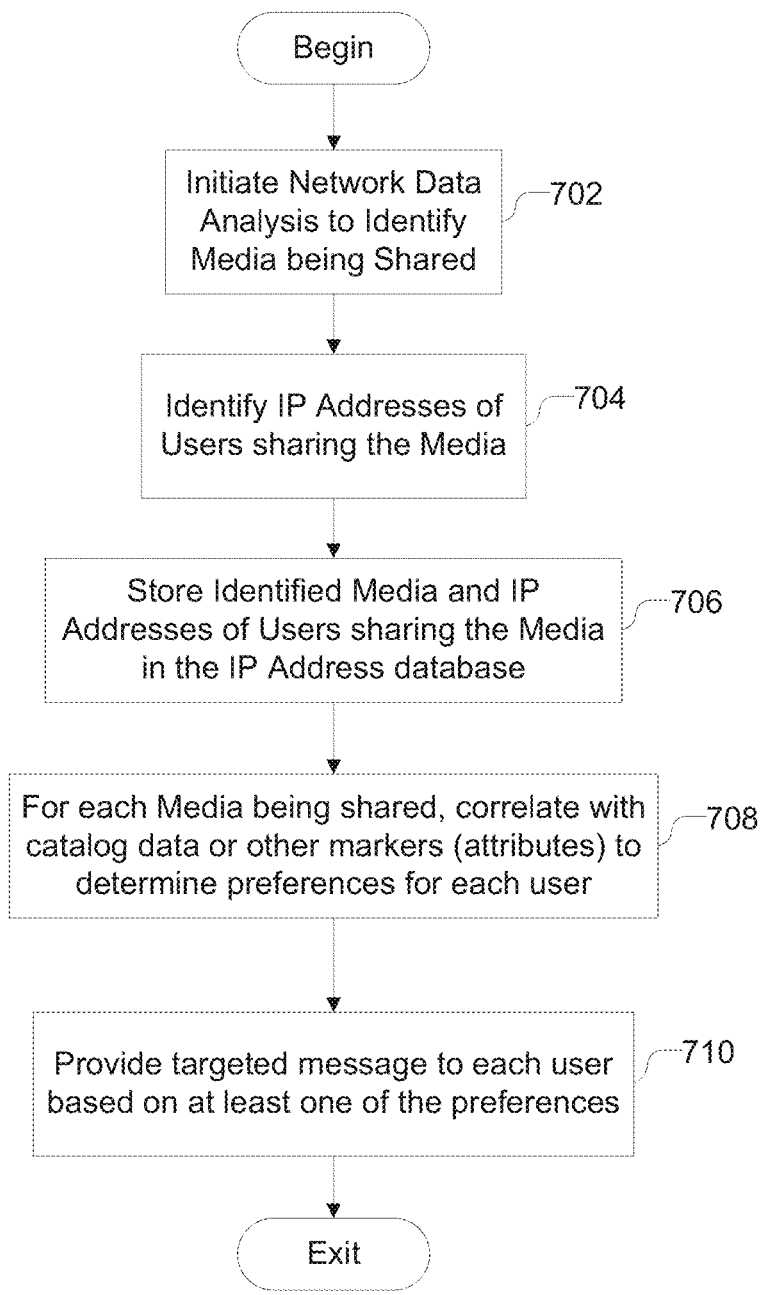
FIG. 7 is an illustration of the process of utilizing information collected about BitTorrent users to provide targeted content in accordance with one or more embodiments of the present invention.

FIG. 7 is an illustration of the process of utilizing information collected about BitTorrent users to provide targeted content in accordance with one or more embodiments of the present invention. As illustrated, in step 702, the system initiates network data analysis by identifying and reporting on precisely what media is being shared or downloaded at each surveyed IP Address. The system identifies the IP addresses of users sharing the media in step 704 and stores the identified media and IP addresses of the users sharing the media in the IP address database, e.g. 706, as illustrated in Table 4, for example.

Table 4 is a tabular representation of exemplary data collected during network data analysis. In step 708, the data may be correlated with catalog data or other markers to develop inferences about each user's preference. Also, secondary analysis, e.g. correlating by one attribute, may further provide the needed information for a targeted campaign. Multiple iterations of this process build stronger and stronger predictive value into the resulting inferences which in turn increases the monetary value of the reports generated as output. An example of such a report is given in Table 5, where the categorized data generated by the system have been organized by IP Address (which is equivalent to organization by household, in many instances); and, Table 6 represents the data pooled into groups organized by zip code, which transformation provides useful information for marketing purposes such as the quantity of prospective customers for certain types of goods and services in each zone. Likewise, Table 7 is a transformation of the data representing the distribution of said users by city, which can be achieved using available geographic indicators such as DMAs.

TABLE 4

User Activity Record According to IP Address.
IP

| 75.94.169.227 | 24.19.128.64 | 75.95.79.229 | 50.12.180.232 | 96.39.149.189 |
|---|---|---|---|---|
| Colbert Report (TV) | The Hobbit (Movie) | Taylor Swift (Music) | How I Met Your Mother (TV) | Lincoln (Movie) |
| Finding Nemo (Movie) | Maroon 5 (Music) | Arrow (TV) | Django (Movie) | Grey's Anatomy (TV) |
| Rihanna (Music) | Game of Thrones (TV) | Les Miserables (Movie) | The Luminees (Music) | Justin Timberlake (Music) |

TABLE 5

User preferences categorized by IP Address (i.e., by household).
IP

| 75.94.169.227 | 24.19.128.64 | 75.95.79.229 | 50.12.180.232 | 96.39.149.189 |
|---|---|---|---|---|
| Comedy (TV) | Adventure, Fantasy (Movie) | Country (Music) | Comedy (TV) | Biography, Drama (Movie) |
| Animation, Adventure (Movie) | Pop (Music) | Action, Adventure (TV) | Adventure, Crime (Movie) | Drama (TV) |
| R&B (Music) | Adventure, Drama (TV) | Drama, Musical (Movie) | Indie Folk (Music) | Pop, R&B (Music) |

TABLE 6

User preferences categorized by zip code.
Zip Code

| 44108 | 22401 | 35462 | 46124 | 76109 |
|---|---|---|---|---|
| Adventure (Movie) | Documentary (Movie) | Horror (Movie) | Comedy (Movie) | Action (Movie) |
| Romance (Movie) | Mystery (Movie) | Action (Movie) | Drama (Movie) | Thriller (Movie) |
| Comedy | History Channel | HBO (TV) | AMC | NBC (TV) |
| Central (TV) | | (TV) | (TV) | |
| ABC (TV) | A&E (TV) | MTV (TV) | FX (TV) | Show Time (TV) |

TABLE 7

User preferences organized by geographic indicators.
DMA

| Los Angeles | Dallas/Ft Worth | Miami | New York | Chicago |
|---|---|---|---|---|
| Horror (Movie) | Thriller (Movie) | Documentary (Movie) | Action (Movie) | Comedy (Movie) |
| Mystery (Movie) | Action (Movie) | Drama (Movie) | Romance (Movie) | Adventure (Movie) |
| ABC (TV) | NBC (TV) | History Channel (TV) | FX (TV) | A&E (TV) |
| HBO (TV) | MTV (TV) | Show Time (TV) | Comedy Central (TV) | AMC (TV) |

One or more embodiments of the present invention further catalog these results by geographic location (e.g., zip code) and any other criteria that can be obtained, as desired. The database generated by embodiments of the present invention is preferably a relational database which will allow for any variable to be used as index value. For example, one may request data based on genre, and receive either IP Addresses or Zip Codes. Subscribers desiring access to these data may log in to a web-based host or via an application on their local machine and query the data using desired parameters. They may also submit requests for new searches to be performed according to their specific needs and interests. For example, if the above data had surveyed a network for the presence of media content, but a client desired to know what percentage of the media content were licensed as opposed to infringing, a new set of search parameters could be quickly generated by a system administrator, for example, and within a short period of time, the results would be available for report generation.

As a further advantage, the methods and systems of the present invention optionally include graphical reporting functions, which can present the data collected and generated by the system in colorful charts and graphs, thereby making it easier to understand and use in business practices. Such "high-level" analysis tool can present characteristics of a selected population of people according to desired criteria, which can be represented in static charts or interactive dashboard applications in a graphical user interface. Examples of high level analysis include, but are not limited to: audience analysis (e.g., how popular is a certain movie or artist in this geographic area?); consumer habits and preferences (e.g., how much time spent watching media content, how much is purchased versus illegally downloaded?). And still further, advantageously, these results can be overlaid with separate statistics applicable to the IP Addresses or geographic area of the users to incorporate demographic and other factors into results.

These results are valuable to advertising service providers, market researchers, businesses conducting market research, and even social scientists researching cultural trends. Thus, for example, in step 710, the system allows for targeted content to be provided by any of these and other services to each user based on at least one of the user preferences determined in step 708. As social networking becomes increasingly commercialized, highly individualized sales practices can be implemented using the data collected and reported by the present invention. Accordingly, embodiments of the invention correlate IP Addresses and user identifying information with email addresses and user IDs corresponding to accounts on popular social networking platforms like Facebook, Foursquare, Amazon, EBay, and such. Additionally or alternatively, analogous and/or identical operations can be performed on Ad Exchanges and Data Exchanges, for example those which use "Cookie Data" to identify accounts. The data may be collected in IP form, and it may be correlated with information from Ad Exchanges such as Google AdX, AppNexus, and the like, and/or from data exchanges such as Exelate, Bluekai.lso, and the like.

Applications of embodiments of the present invention include, for example, the following scenarios: A film production studio would like to advertise its new sit-com to all users who have shown interest in TV comedies; A movie studio would like to display their new trailer to the sequel of a movie, targeting users who have shown interest in the first release in the series, where interest was shown for example in their having obtained and shared media content relating to the series or its genre; A recording artist would like to advertise ticket sales in a city they are performing in, only to households who have shown interest in their content specifically or else closely related content.

More particularly, in the Ad Network industry, user IDs and IP addresses correlated to user preference data are highly coveted. The databases of the present invention can be transformed into formats used in a particular industry for immediate applicability or on a pay-per-use basis. Ad networks maintain the online banner ad space provided on websites. They determine which ads are displayed to whom. The data collected by methods of the present invention provides information about the type of media many households are interested in. Thus, enables more highly targeted ads, and therefore deliver better profit to website owners.

The present invention also comprises an advantageous means for improving the accuracy of data gathered from the network surveillance presented herein. The System captures the IP Address and time of capture immediately as the connection is built. This means the target computer is running a form of Client software. This connection is verified with a cryptographic hash from the participant and is verified to correctly match with the file which is sent over to the system from the target computer, so the system can specifically confirm that it is sharing The File. For example, based on the BitTorrent protocol, the target computer sends a message via the connection to tell the system how many pieces of the file they have as soon as the Hash Tag is verified. From this process, the system can confirm the target computer is sharing the specific file at the specific time with the percentage.

Marketing and Advertisement Uses

Embodiments of the present invention are specially adapted for use in the field of marketing. In one embodiment, the segmented data in the IP Address database may be applied to an Ad Network. An Ad Network, being defined as a single or a collection of ad spaces on websites. Ad networks maintain the online banner space typically seen on websites, web based software, desktop software, mobile applications, or any other software median used to display information to a user. They determine which ads or messages are displayed to whom. Available ad spaces are also referred to herein as Ad Inventory.

The segmented data from the IP Address database allows inference as to the type of preferences that households are interested in, block 708. Thus, providing better predictability as to the type of advertisement or message a viewer is more likely to engage with. Leveraging this information will enable the system to serve more highly targeted ads, and therefore deliver better profit to website owners. In one embodiment, the segmented data in the IP Address database may be applied to a website, an application, or any other media used to display information, for the purpose of delivering content, e.g. 710, which is better suited to the User than that of an alternative which would otherwise be selected.

In one embodiment, a user may take on campaigns to deliver a targeted message to a group of Peers within the IP Address database, or any other Peers yet to be added into the IP Address database. This yet to be discovered group can be a population of households which match the same characteristics as a sub-set of Peers within the IP Address database. In one or more embodiments, the newly created population can be used to replace or augment the targeted group of Peers from the IP Address database.

In addition to subscribers using the present invention for advertising, embodiments of the invention can also accommodate Publisher subscribers. Publisher content comprises any website, web-based software, desktop software, mobile applications, or any other digital assets used to display information to a user. A subscriber outsources their Ad Inventory to IP Media (this is an example name used for illustration herein as a name for an Administrator company operating the systems and methods of the invention described herein). IP Media would be responsible for placing material within their ad inventory, in designated ad space(s). IP Media's role is to leverage the data from the IP Address database, so material which is more relevant than that of a random sample or control can be placed within the ad inventory spaces provided by a Publisher.

A single embodiment of the invention may service both Advertiser and Publisher subscribers simultaneously. In a preferred embodiment, the Ad Exchange represents an excess or surplus of targeted messaging campaigns provided by Advertisers. The Ad Exchange is a liquidity pool of content, any of which is ready to be acquired by IP Media when needed. These campaigns and content are segmented by category, and may be chosen based on categorical data from the IP Address database. The Publisher desires messages relevant to their site content so clicks by viewers are more likely to occur. IP Media can provide highly relevant campaigns which are more likely to be clicked by a user. When IP Media does not have a relevant message or campaign available, it may acquire relevant messages or advertisements from the Ad Exchange and take a small mark up as profit (e.g., $0.50 CPM). IP Media's data from its IP Address database is implemented in this model by choosing to acquire the messages or advertisements from the Ad Exchange which are most suited to the viewer. For example, when a user visits the website of a Publisher client, information about the user's interest is instantly available through the database. And if the user is interested in Country music, an appropriate ad will be provided from the Ad Exchange (or other relevant as campaigns).

In another preferred embodiment, the System surveys networks to collect information from the website, web based software, desktop software, mobile applications, or any other software medium used to display information to a user. The information collected is anything relevant to the user interacting with the Publisher. Such as preferences, behavioral habits, location information, or identity. The information is saved into the IP Address database, and organized and segmented in a similar way as the data referenced in previous sections. The data saved into the database can be in IP Address, Cookie, or any other format which identifies the specific user, entity, or household. If a Cookie format is chosen, and it corresponds to an IP Address which already exists within the IP Address database, than this process will match the two together enabling IP Addresses to be used in place of cookies, and cookies to be used in place of the IP Address. This solves the problem commonly encountered in the prior art whereby an organization requests information to be in only Cookie format, or only IP Address format. In this scenario, IP Media may act as the translation service between the two formats.

In another embodiment, contents and information are taken from the IP Address database and may be directed to a Data Aggregator, an Ad Exchange, or any other third party that has interest in the contents of the IP Address database. The Ad Exchange is a third party representing a market or liquidity pool of buyers and sellers of content and Ad Inventory. A Data Aggregator is an additional third party organization that collects information from a multitude of sources. This organization typically combines the data from the IP Address database with data from other sources for a multitude of uses.

One or more embodiments enable targeting of a single or multitude of IP addresses from the IP address database, and delivering interactive ads that require input from the user. The ads may serve as a survey to discover additional consumer preferences or to augment information about the users in the IP Address database.

Insurance Industry

In a further application of the above described systems and methods, advantageous use is provided for the particular needs of the insurance industry. On one hand, leads can be generated for policy sales by correlating user data to relevant insurable needs such as property ownership, pet ownership, home ownership, and business practices. On the other hand, underwriters and risk adjusters can generate statistics about the performance and risks of use associated with any goods and services. For example, most movies need to be insured at some point in production. As of now, there are inadequate means for stakeholders to insure against piracy of a movie (or other media content). The most potent source of risk is the significant loss of revenue that may occur due to illegal file sharing on P2P networks. The present invention provides a means for assessing these risks according to all of the above described criteria and methods, which enables, for the first time, underwriting of these risks; for example, data from the IP Address database can be analyzed to determine which Peers are downloading and sharing content illegally. Because this particular field of insurance coverage remains underdeveloped, embodiments of the present invention provide stakeholders, underwriters and insurers means to coordinate and collect data deemed relevant, propose monetary values and risk rates, and arrive at agreements according to insurance business principles known in the relevant art. In particular, the risk assessments based on past activity on a network for property similar to the insured property can be used to calculate premiums and policy values, as well as coverage limits, terms, and exclusions. Not only is this information intended for use when drafting an insurance policy, but it can also be used by insurers a priori to develop new products based on previously unavailable data.

A further embodiment of the present invention enables subscribers who are tracking piracy to also initiate legal action against infringers identified on a network. Not only are names and addresses discoverable by way of the data acquired by the present invention, but also metrics which serve as evidence of the time, place, parties, and volume involved in the illegal sharing of copyrighted, unlicensed, or otherwise protected data. Reports generated by the system can be used in legal proceedings, while information gathered from the analysis can be passed on to law enforcement, or alternatively, utilized to automatically generate DMCA takedown notices, cease and desist letters, and other mailings as appropriate to the subject matter in each case. An example method of such a mailing service comprises the steps of: an administrator or other organization contracts to use the system to send letters and mail to one or more individuals in the IP Address database; the IP Address database provides the Internet Service Provider (ISP) being used by each Peer; an administrator optionally coordinates the communications between the ISP, such as when necessary to acquire the Peer's true consumer address information from the ISP.

Therefore, the present invention includes a user-friendly, cloud-based system that supports anti-piracy campaigns. The system provides tools accessible through a user interface, wherein the tools represent optional commands and parameters that can be executed in an anti-piracy campaign. In other words, subscribers can easily and intuitively plan and implement anti-piracy campaigns using the system and methods of the present invention. DMCA notification capabilities and other basic legal services can be brought inhouse to subscribers who access the invention via their local computing devices, and directed notices can be generated. Because specific elements apply to require responsive action in certain parties, including not only the infringer but also the internet service provider or other owner/host of the machines used for infringement, their timely and proper responses can be monitored by embodiments of the invention as well. For example, hosting services must investigate the alleged infringement, and notified infringers may often be required to complete an educational program. MPAA, RIAA, government agencies and other authorities can reach illegal file sharers and deliver notices, warnings, or messages educating them about where to legally access content and what are the negative effects of piracy.

A means for educating the public about piracy, which can comprise part of a legal compliance method, is also provided. In one embodiment, it can be determined that a select Peer, or multitude of Peers in the IP Address database are downloading and distributing content without proper authorization. The methods referenced above may be utilized to deliver warning messages to these Peers, often times while they are in the process of doing it. This enables a copyright owner to directly engage with a Peer while they are infringing on the copyright, either in real time or at a later date. The message will be displayed on Ad Inventory, selected by the System or administrator, on a single or plurality of websites, web based software, desktop software, mobile applications, or any other software median used to display information to a user. The Peer may be delivered any message, often times an educational one, warning them of the effects and consequences of their actions, and informing them of the proper way of obtaining the material. Thus a further advantage of the present invention, demonstrating the cross-compatibility of the above described features and embodiments, is that the invention can utilize relationships with advertisement exchanges to strategically place banner ads on websites hosting pirated content or pages being viewed by an infringer. This enables stakeholders to directly engage an audience that otherwise actively avoids them.

Countermeasures

Embodiments of the present invention include proactive tools, even offensive weapons, to thwart illegal activity on networks. There are a number of tech-savvy "hacks" that can be implemented on a peer-to-peer network in this regard, in particular to disrupt the transfer of data and information between Peers (in compliance with applicable laws). Typical examples include emulating a Peer or a multitude of Peers connected to the Overlay Network, wherein these emulated Nodes typically connect with other nodes and clog their bandwidth. Or they passively wait for many nodes to connect to them and clog their bandwidth.

While the invention disclosed has been described by means of specific embodiments and applications thereof, numerous modifications and variations may be made thereto by those skilled in the art without departing from the scope of the invention as described and set forth in the claims attached hereto.

What is claimed is:

1. A method for managing data assets associated with Peer-to-Peer network users comprising:
obtaining search criteria based for a copyrighted work;
maintaining a database of at least one torrent file website;
periodically and automatically scraping said at least one torrent file website in the database to locate at least one torrent file based on said search criteria;
verifying that the at least one torrent file corresponds to a media file containing said copyrighted work, wherein said verification is for eliminating trailers and previews from the at least one torrent file;
storing the verified ones of the at least one torrent file to a torrent file database;
automatically obtaining tracker server information from the verified ones of the at least one torrent file;
automatically receiving from said tracker server a plurality of participant IP addresses of participants currently connected to the verified ones of the at least one torrent file;
storing said plurality of participant IP addresses into an IP address database;
automatically establishing a connection with each of said participants and receiving a cryptographic hash, download completion status and capture time for the participant;
automatically determining if the participant is sharing the media file by verifying that said participant's cryptographic hash correctly matches with the at least one torrent file and said download completion status is a non-zero value;
determining at least one preference based on inferences from one or more attributes of said verified ones of the at least one torrent file for each one of said participants determined to be sharing the media file; and
displaying a targeted message to each one of said participants based on said at least one preference.

2. The method of claim 1, wherein said at least one preference is piracy and said targeted message is a Digital Millennium Copyright Act (DMCA) notice.

3. The method of claim 1, wherein said at least one preference is type of goods and services and said targeted message is advertisement for said goods and services.

4. The method of claim 1, wherein said at least one preference is type of goods and services and said targeted message is a survey configured to obtain additional preference information about said one of said participants.

5. The method of claim 1, further comprising updating the plurality of participant IP addresses by receiving a new plurality of participant IP addresses from the tracker server after a set period of time.

6. The method of claim 1, wherein said eliminating trailers comprises determining that the at least one torrent file is not a trailer based on size of the torrent file.

7. The method of claim 1, wherein said eliminating previews comprises determining that the at least one torrent file is not a preview based on size of the torrent file.

8. A system for managing data assets associated with Peer-to-Peer network users comprising:
a non-transitory computer-readable medium comprising computer-readable instructions;
a communication network;
a processor configured to execute said computer-readable instructions to:
obtain search criteria for a copyrighted work;
maintain a database of at least one torrent file website;
periodically and automatically scrape said at least one torrent file website in said database to locate at least one torrent file according to said search criteria;
verify that the at least one torrent file corresponds to a media file containing said copyrighted work by eliminating preview and trailer media files from the at least one torrent file, wherein said verification is based on size of the at least one torrent file;
store the verified ones of the at least one torrent file to a torrent file database;
identify a plurality of participant IP addresses of participants sharing the verified ones of the at least one torrent file;
store said plurality of participant IP addresses into an IP address database;

automatically establish a connection with each of said participants and receiving a cryptographic hash, download completion status and capture time for the participant;

automatically determine if the participant is sharing the media file by verifying that said participant's cryptographic hash correctly matches with the at least one torrent file and said download completion status is a non-zero value;

determine at least one preference based on inferences from one or more attributes of said verified ones of the at least one torrent file for each one of said participants determined to be sharing the media file; and display a targeted message to said one of said participants based on said at least one preference.

9. The system of claim 8, wherein said at least one preference is piracy and said targeted message is a DMCA notice.

10. The system of claim 8, wherein said at least one preference is type of goods and services and said targeted message is advertisement for said goods and services.

11. The system of claim 8, wherein said at least one preference is type of goods and services and said targeted message is a survey configured to obtain additional preference information about said one of said participants.

12. The system of claim 8, wherein said identify a plurality of participant IP addresses of participants comprises the steps of:

obtaining tracker server information from the at least one torrent file; and receiving from said tracker server said plurality of participant IP addresses of participants sharing the at least one torrent file.

13. The system of claim 12, wherein said steps further comprises updating the plurality of participant IP addresses by receiving a new plurality of participant IP addresses from the tracker server after a set period of time.

14. A method for managing data assets associated with Peer-to-Peer network users comprising:

obtaining search criteria for a copyrighted work;
maintaining a database of at least one torrent file website;

periodically and automatically scraping said at least one torrent file website to obtain at least one torrent file based on said search criteria;

obtaining Info Hash for the at least one torrent file;

verifying that the at least one torrent file corresponds to a media file containing said copyrighted work, wherein said verification is to eliminate previews and trailers from the at least one torrent file;

storing the verified ones of the at least one torrent file to a torrent file database;

performing network surveillance using the Info Hash to identify a plurality of participant IP addresses of participants sharing the at least one torrent file;

storing said plurality of participant IP addresses into an IP address database;

automatically establishing a connection with each of said participants and receiving a cyptographic hash, download completion status and capture time for the participant;

automatically determining if the participant is sharing the media file by verifying that said participant's cryptographic hash correctly matches with the at least one torrent file and said download completion status is a non-zero value, determining at least one preference based on inferences from one or more attributes of said at least one torrent file for each one of said participants determined to be sharing the media file; and displaying a targeted message to said one of said participants based on said at least one preference.

15. The method of claim 14, wherein said at least one preference is piracy and said targeted message is a DMCA notice.

16. The method of claim 14, wherein said at least one preference is type of goods and services and said targeted message is advertisement for said goods and services.

17. The method of claim 14, wherein said at least one preference is type of goods and services and said targeted message is a survey configured to obtain additional preference information about said one of said participants.

* * * * *